United States Patent
Zenkyu et al.

(10) Patent No.: US 10,998,948 B2
(45) Date of Patent: May 4, 2021

(54) OAM RECEPTION APPARATUS, OAM RECEPTION METHOD, AND OAM TRANSMISSION SYSTEM

(71) Applicant: NEC CORPORATION, Tokyo (JP)

(72) Inventors: Ryuji Zenkyu, Tokyo (JP); Eisaku Sasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/039,371

(22) Filed: Sep. 30, 2020

(65) Prior Publication Data

US 2021/0105049 A1 Apr. 8, 2021

(30) Foreign Application Priority Data

Oct. 3, 2019 (JP) .............................. JP2019-183005

(51) Int. Cl.
H04B 7/02 (2018.01)
H04B 7/0456 (2017.01)

(52) U.S. Cl.
CPC ................................. H04B 7/0456 (2013.01)

(58) Field of Classification Search
CPC .................................................. H04B 7/0456
USPC .............................................................. 375/267
See application file for complete search history.

(56) References Cited

U.S. PATENT DOCUMENTS

| 9,755,323 | B2* | 9/2017 | Li | H01Q 21/00 |
|---|---|---|---|---|
| 2015/0188660 | A1* | 7/2015 | Byun | H04J 14/04 |
| | | | | 398/44 |
| 2016/0043794 | A1* | 2/2016 | Ashrafi | H04B 7/0671 |
| | | | | 370/329 |
| 2017/0163451 | A1* | 6/2017 | Willner | H04L 25/03891 |
| 2018/0287262 | A1* | 10/2018 | Patri | G02B 5/3083 |
| 2018/0287263 | A1* | 10/2018 | Hirabe | H01Q 21/20 |
| 2019/0020434 | A1* | 1/2019 | Adachi | H04L 5/04 |
| 2019/0149251 | A1* | 5/2019 | Zenkyu | H01Q 15/0013 |
| | | | | 375/262 |
| 2019/0334609 | A1* | 10/2019 | Alavi | H01Q 21/20 |

FOREIGN PATENT DOCUMENTS

| JP | 2013-211887 A | 10/2013 |
|---|---|---|
| WO | 2016/063315 A1 | 4/2016 |

* cited by examiner

Primary Examiner — Helene E Tayong

(57) ABSTRACT

An interference compensation unit in an OAM reception apparatus removes the interference component caused by horizontally polarized waves relative to vertically polarized waves from a first mode vertical component reception signal obtained by an OAM reception unit using both a first mode horizontal component reception signal and a second mode horizontal component reception signal.

8 Claims, 12 Drawing Sheets $$e^{i\frac{2\pi}{4}} \cdot \begin{bmatrix} 0 & 0 \\ 0 & 1 \\ 0 & 2 \\ 0 & 3 \end{bmatrix}$$

Fig. 3

OAM RECEPTION APPARATUS, OAM RECEPTION METHOD, AND OAM TRANSMISSION SYSTEM

INCORPORATION BY REFERENCE

This application is based upon and claims the benefit of priority from Japanese patent application No. 2019-183005, filed on Oct. 3, 2019, the disclosure of which is incorporated herein in its entirety by reference.

BACKGROUND ART

The present disclosure relates to an OAM reception apparatus, an OAM reception method, and an OAM transmission system.

A radio communication system which performs radio communication by combining spatial multiplexing transmission and dual polarized wave transmission of vertically and horizontally polarized wave transmission has been proposed in, for example, Japanese Unexamined Patent Application Publication No. 2013-211887. In the radio communication system disclosed in Japanese Unexamined Patent Application Publication No. 2013-211887, spatial demultiplexing processing for demultiplexing a spatial multiplexed signal spatially multiplexed by MIMO (multiple-input and multiple-output) and inter-polarization interference compensation processing for compensating inter-polarization interference are executed in series (i.e., independently and sequentially executed).

On the other hand, a radio transmission system (i.e., orbital angular momentum (OAM) transmission system) using electromagnetic waves having OAM has recently attracted attention (e.g., International Patent Publication No. WO 2016/063315).

However, no method has yet been proposed for receiving a signal wirelessly transmitted by a combination of OAM transmission and dual polarized wave transmission with inter-polarization interference compensation.

SUMMARY

An object of the present disclosure is to provide an OAM reception apparatus, an OAM reception method, and an OAM transmission system that can receive a signal wirelessly transmitted by a combination of OAM transmission and dual polarized wave transmission with inter-polarization interference compensation.

In a first example aspect, an OAM reception apparatus includes:

a plurality of reception antenna elements configured to receive a plurality of radio signals respectively transmitted from a plurality of transmission antenna elements of an OAM (orbital angular momentum) transmission apparatus, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves;

a first OAM reception unit configured to form a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by preforming polarization separating and reception radio processing on a plurality of reception radio signals received by the plurality of reception antenna elements, by a first OAM reception weight matrix;

a second OAM reception unit configured to form a first mode horizontal component reception signal corresponding to the first OAM mode and a second mode horizontal component reception signal corresponding to the second OAM mode by multiplying the plurality of horizontal component signals by a second OAM reception weight matrix;

a first interference compensation unit configured to remove an interference component caused by the horizontally polarized waves relative to the vertically polarized waves using both the first mode horizontal component reception signal and the second mode horizontal component reception signal from the first mode vertical component reception signal;

a second interference compensation unit configured to remove an interference component caused by the horizontally polarized waves relative to the vertically polarized waves using both the first mode horizontal component reception signal and the second mode horizontal component reception signal from the second mode vertical component reception signal;

a third interference compensation unit configured to remove an interference component caused by the vertically polarized waves relative to the horizontally polarized waves using both the first mode vertical component reception signal and the second mode vertical component reception signal from the first mode horizontal component reception signal; and a fourth interference compensation unit configured to remove an interference component caused by the vertically polarized waves relative to the horizontally polarized waves using both the first mode vertical component reception signal and the second mode vertical component reception signal from the second mode horizontal component reception signal.

In a second example aspect, an OAM reception method executed by an OAM reception apparatus including:

a plurality of reception antenna elements configured to receive a plurality of radio signals respectively transmitted from a plurality of transmission antenna elements of an OAM (orbital angular momentum) transmission apparatus, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves. The OAM reception method includes:

forming a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by performing polarization separating and reception radio processing on a plurality of reception radio signals received by the plurality of reception antenna elements, by a first OAM reception weight matrix;

forming a first mode horizontal component reception signal corresponding to the first OAM mode and a second mode horizontal component reception signal corresponding to the second OAM mode by multiplying the plurality of horizontal component signals by a second OAM reception weight matrix;

removing an interference component caused by the horizontally polarized waves relative to the vertically polarized waves using both the first mode horizontal component reception signal and the second mode horizontal component reception signal from the first mode vertical component reception signal;

removing an interference component caused by the horizontally polarized waves relative to the vertically polarized waves using both the first mode horizontal component reception signal and the second mode horizontal component reception signal from the second mode vertical component reception signal;

removing an interference component caused by the vertically polarized waves relative to the horizontally polarized waves using both the first mode vertical component reception signal and the second mode vertical component reception signal from the first mode horizontal component reception signal; and removing an interference component caused by the vertically polarized waves relative to the horizontally polarized waves using both the first mode vertical component reception signal and the second mode vertical component reception signal from the second mode horizontal component reception signal.

In a third example aspect, an OAM transmission system includes:

an OAM (orbital angular momentum) transmission apparatus; and an OAM reception apparatus.

The OAM transmission apparatus is configured to transmit, from a plurality of transmission antenna elements, a plurality of radio signals, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves.

The OAM reception apparatus includes:

a plurality of reception antenna elements configured to receive the plurality of transmitted radio signals;

a first OAM reception unit configured to form a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by performing polarization separating and reception radio processing on a plurality of reception radio signals received by the plurality of reception antenna elements, by a first OAM reception weight matrix;

a second OAM reception unit configured to form a first mode horizontal component reception signal corresponding to the first OAM mode and a second mode horizontal component reception signal corresponding to the second OAM mode by multiplying the plurality of horizontal component signals by a second OAM reception weight matrix;

a first interference compensation unit configured to remove an interference component caused by the horizontally polarized waves relative to the vertically polarized waves using both the first mode horizontal component reception signal and the second mode horizontal component reception signal from the first mode vertical component reception signal;

a second interference compensation unit configured to remove an interference component caused by the horizontally polarized waves relative to the vertically polarized waves using both the first mode horizontal component reception signal and the second mode horizontal component reception signal from the second mode vertical component reception signal;

a third interference compensation unit configured to remove an interference component caused by the vertically polarized waves relative to the horizontally polarized waves using both the first mode vertical component reception signal and the second mode vertical component reception signal from the first mode horizontal component reception signal; and a fourth interference compensation unit configured to remove an interference component caused by the vertically polarized waves relative to the horizontally polarized waves using both the first mode vertical component reception signal and the second mode vertical component reception signal from the second mode horizontal component reception signal.

BRIEF DESCRIPTION OF DRAWINGS

The above and other aspects, features and advantages of the present disclosure will become more apparent from the following description of certain exemplary example embodiments when taken in conjunction with the accompanying drawings, in which:

FIG. 3 shows an example of a basic weight matrix (OAM transmission weight matrix);

EMBODIMENTS

Example embodiments will be described below with reference to the drawings. In the example embodiments, the same or equivalent elements are denoted by the same reference signs, and repeated description is omitted.

First Example Embodiment

<Overview of OAM Transmission System>

Figure 1:
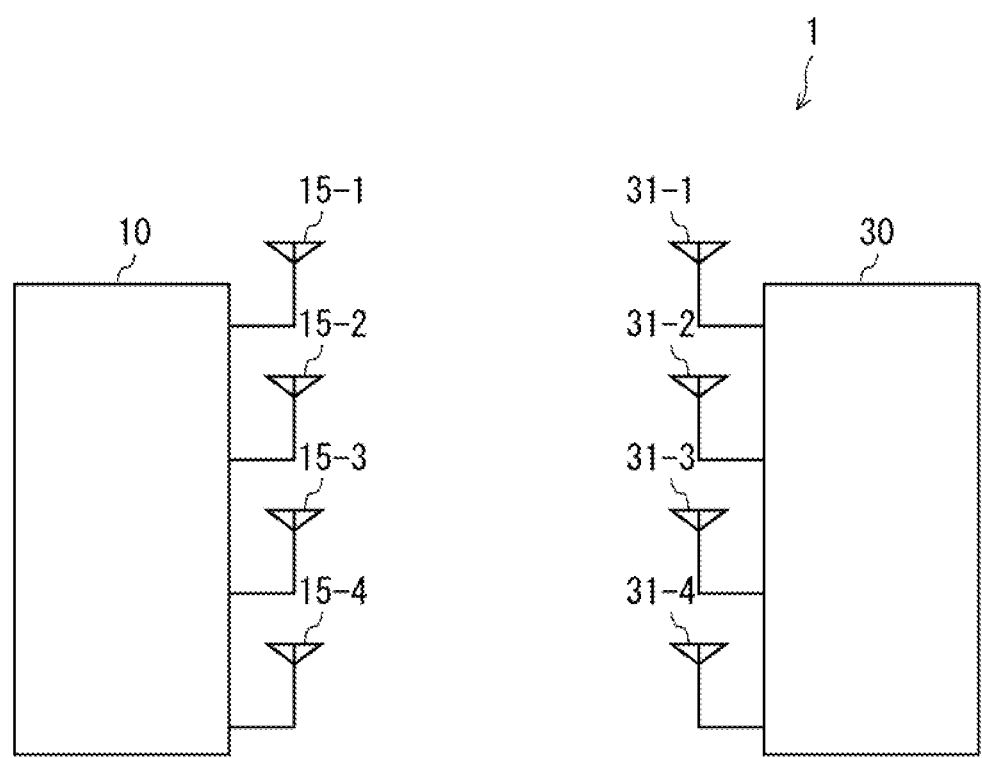
FIG. 1 is a diagram showing an example of an OAM transmission system according to a first example embodiment.

FIG. 1 shows an example of an OAM transmission system according to a first example embodiment. In FIG. 1, an OAM transmission system 1 includes an OAM transmission apparatus 10 and an OAM reception apparatus 30. The OAM transmission apparatus 10 and the OAM reception apparatus 30 are, for example, fixedly installed and used in a line-of-sight environment.

In FIG. 1, the OAM transmission apparatus 10 includes antenna elements 15-1 to 15-4. The OAM reception apparatus 30 includes antenna elements 31-1 to 31-4. In the following description, the antenna elements 15-1 to 15-4 are sometimes collectively referred to as "antenna elements 15". Further, the antenna elements 31-1 to 31-4 are sometimes collectively referred to as "antenna elements 31". Here, the number of the antenna elements 15 and the number of the antenna elements 31 are four, but the number is not limited to four, and may be two or more.

The antenna elements 15-1 to 15-4 are placed, for example, in a circular array. That is, the antenna elements 15 constitute a UCA (Uniform Circular Array) antenna. The antenna elements 31-1 to 31-4 are arranged in, for example, a circular array. That is, the antenna elements 31 constitute a UCA (Uniform Circular Array) antenna.

The OAM transmission apparatus 10 transmits "a plurality of radio signals" from the antenna elements 15-1 to 15-4, respectively. Each radio signal includes a first OAM mode multiplexed radio signal transmitted by vertically polarized waves and a second OAM mode multiplexed radio signal transmitted by horizontally polarized waves. The first OAM mode multiplexed radio signal and the second OAM mode multiplexed radio signal are formed using M (M is a natural number greater than or equal to 2) OAM modes from the first OAM mode to the M-th second OAM mode. In the following description, in order to simplify the explanation, as an example, it is assumed that the first OAM mode multiplexed radio signal and the second OAM mode multiplexed radio signal are formed using two OAM modes (first OAM mode and second OAM mode), respectively. Generality will not be lost by this explanation.

The OAM reception apparatus 30 receives a plurality of radio signals transmitted from the antenna elements 15-1 to 15-4 of the OAM transmission apparatus 10 by each of the antenna elements 31-1 to 31-4. That is, the radio signal received by each of the antenna elements 31 is a radio signal in which a plurality of radio signals transmitted from the antenna elements 15-1 to 15-4 are spatially multiplexed.

Configuration Example of OAM Transmission Apparatus

Figure 2:
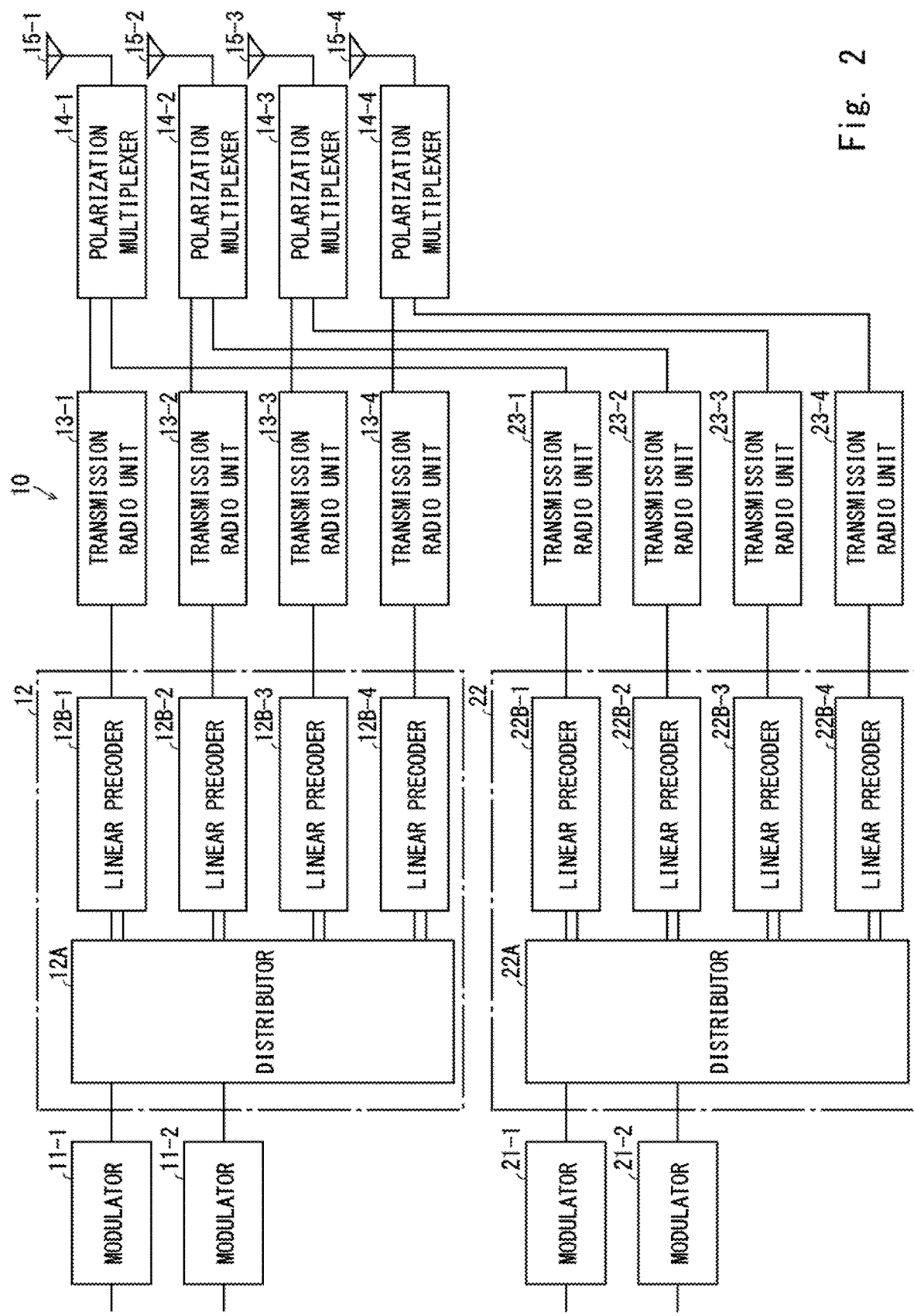
FIG. 2 is a block diagram showing an example of an OAM transmission apparatus according to the first example embodiment.

FIG. 2 is a block diagram showing an example of the OAM transmission apparatus according to the first example embodiment. In FIG. 2, the OAM transmission apparatus 10 includes modulators 11-1, 11-2, 21-1, and 21-2, signal forming units 12 and 22, transmission radio units 13-1 to 13-4 and 23-1 to 23-4, polarization multiplexers 14-1 to 14-4, and antenna elements 15-1 to 15-4. The transmission radio units 13-1 to 13-4 may be collectively referred to as "transmission radio units 13". Further, the transmission radio units 23-1 to 23-4 may be collectively referred to as "transmission radio units 23". Furthermore, the polarization duplexers 14-1 to 14-4 may be collectively referred to as "polarization multiplexers 14".

The modulators 11-1, 11-2, 21-1, and 21-2 receive different transmission streams. Then, each of the modulators 11-1, 11-2, 21-1, and 21-2 modulates the input transmission stream and outputs a resulting modulated signal (i.e., symbols). That is, two different symbols are output from the modulators 11-1 and 11-2 around the same time. Two different symbols are also output from the modulators 21-1 and 21-2 around the same time. The modulators 11-1, 11-2, 21-1, and 21-2 correspond to a plurality of combinations of a plurality of used OAM modes and vertically and horizontally polarized waves, respectively. The patterns of known signal sequences input to the modulators 11-1, 11-2, 21-1, and 21-2 are different from each other. Thus, known signal sequences having different patterns are transmitted by the plurality of combinations of the plurality of used OAM modes and vertically and horizontally polarized waves.

The signal forming unit 12 includes a distributor 12A and linear precoders 12B-1 to 12B-4.

The distributor 12A outputs each of the two symbols input around the same time to the four linear precoders 12B-1 to 12B-4. That is, the distributor 12A distributes the symbols received from the modulator 11-1 to the four linear precoders 12B-1 to 12B-4 to be input to the four linear precoders 12B-1 to 12B-4, respectively. The same applies to the symbols received from the modulator 11-2. That is, a symbol vector composed of two symbols input to the distributor 12A around the same time is input to each linear precoder 12B.

The linear precoders 12B-1 to 12B-4 correspond to four row vectors of "basic weight matrix (OAM transmission weight matrix)", respectively, corresponding to the plurality of used OAM modes (which are, in this example, the first OAM mode and the second OAM mode). A plurality of column vectors of "basic weight matrix (OAM transmission weight matrix)" correspond to the plurality of used OAM modes, respectively.

FIG. 3 shows an example of the basic weight matrix (OAM transmission weight matrix). In the example of the basic weight matrix (OAM transmission weight matrix) shown in FIG. 3, two column vectors having column numbers 0 and 1 correspond to modes 0 and 1, respectively. That is, the amount of shift (amount of phase change) between the values of the four vector elements in the column vector of column number 0 is zero. The amount of shift (amount of phase change) between the values of the four vector elements in the column vector of column number 1 is $\pi/2$.

Returning to the description of FIG. 2, each linear precoder 12B multiplies the input symbol vector by the row vector corresponding to the linear precoder 12B. Then, a multiplexed signal is formed. Each linear precoder 12B outputs the formed multiplexed signal to the corresponding transmission radio unit 13.

The transmission radio units 13-1 to 13-4 receive the multiplexed signals from the linear precoders 12B-1 to 12B-4, respectively, and perform transmission radio processing (digital-to-analog conversion, up-conversion, etc.) on the received multiplexed signals. The transmission radio units 13-1 to 13-4 output the radio signals obtained by the transmission radio processing to the polarization multiplexers 14-1 to 14-4, respectively.

The distributor 22A and linear precoders 22B-1 to 22B-4 of the signal forming unit 22 perform the same processing as that of the distributor 12A and linear precoders 12B-1 to 12B-4, respectively.

That is, the distributor 22A outputs each of the two symbols input around the same time to the four linear precoders 22B-1 to 22B-4.

The linear precoders 22B-1 to 22B-4 correspond to four row vectors of the "basic weight matrix (OAM transmission weight matrix)", respectively, corresponding to the plurality of used OAM modes (which are, in this example, the first OAM mode and the second OAM mode). The plurality of used OAM modes used in the linear precoders 22B-1 to 22B-4 are the same as the plurality of used OAM modes used in the linear precoder 12B-1 to 12B-4. That is, the "basic weight matrix (OAM transmission weight matrix)" used in the linear precoders 22B-1 to 22B-4 is the same as the "basic weight matrix (OAM transmission weight matrix)" used in the linear precoders 12B-1 to 12B-4.

Then, each linear precoder 22B outputs the formed multiplexed signal to the corresponding transmission radio unit 23.

The transmission radio units 23-1 to 23-4 receive the multiplexed signals from the linear precoders 22B-1 to 22B-4, respectively, and perform transmission radio processing (digital-to-analog conversion, up-conversion, etc.) on the received multiplexed signals. The transmission radio units 23-1 to 23-4 output the radio signals obtained by the transmission radio processing to the polarization multiplexers 14-1 to 14-4, respectively.

The polarization multiplexers 14-1 to 14-4 convert the radio signals received from the transmission radio units 13-1 to 13-4 into vertically polarized signals, convert the radio signals received from the transmission radio units 23-1 to 23-4 into horizontally polarized signals, and output the polarization multiplexed radio signals of the vertically polarized signals and the horizontally polarized signals to the antenna elements 15-1 to 15-4, respectively. Thus, the polarization multiplexed radio signals are transmitted from the antenna elements 15-1 to 15-4 according to the used OAM modes. That is, the modulator 11, the signal forming unit 12, and the transmission radio units 13-1 to 13-4 are processing units for forming transmission signals of vertically polarized waves, while the modulator 21, the signal forming unit 22, and the transmission radio units 23-1 to 23-4 are processing units for forming transmission signals of horizontally polarized waves.

As described above, a plurality of radio signals which are mode-multiplexed for a plurality of OAM modes and polarization-multiplexed are transmitted from the antenna elements 15-1 to 15-4 in the OAM transmission apparatus 10.

Configuration Example of OAM Reception Apparatus

Figure 4:
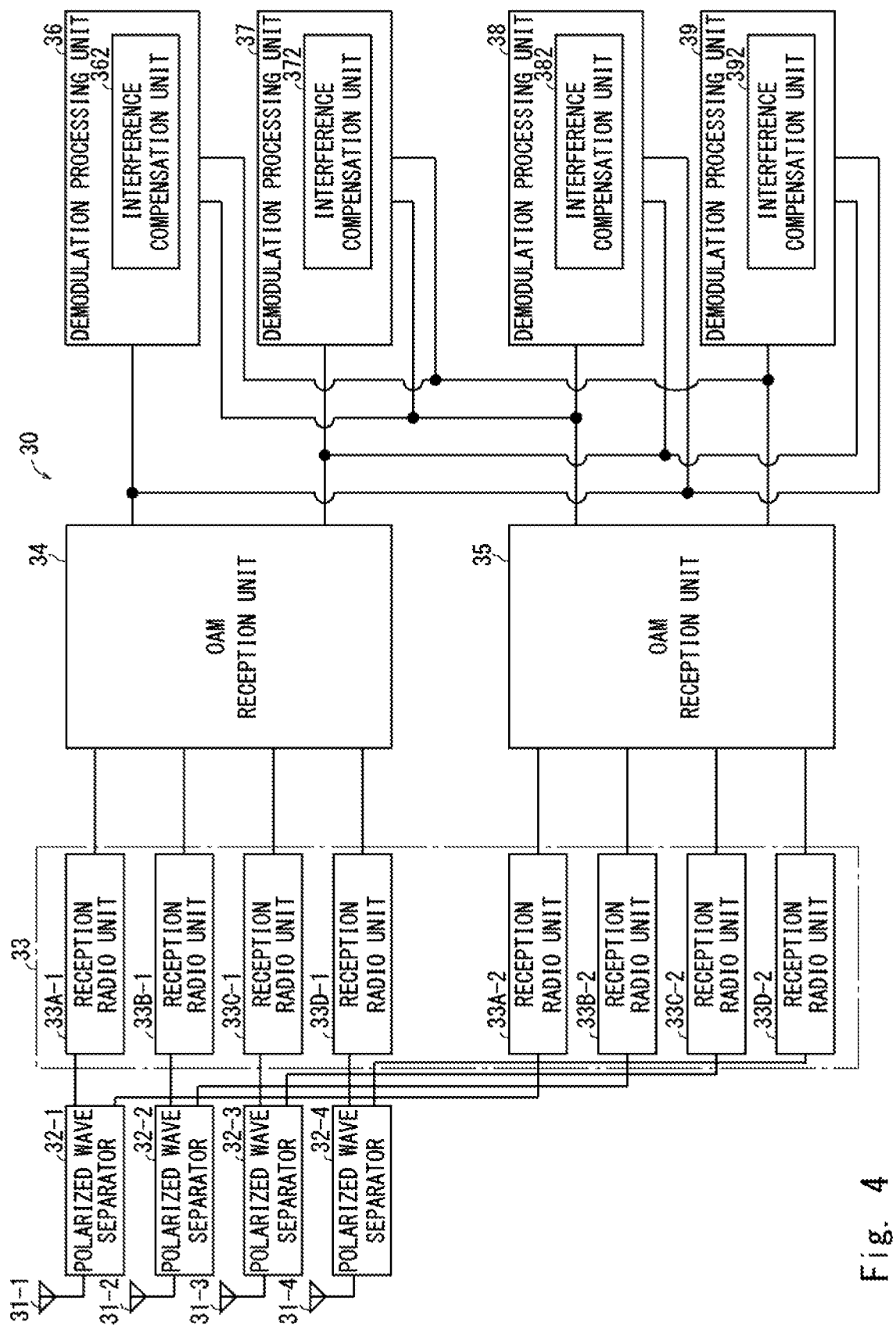
FIG. 4 is a block diagram showing an example of an OAM reception apparatus according to the first example embodiment.

FIG. 4 is a block diagram showing an example of the OAM reception apparatus according to the first example embodiment. In FIG. 4, the OAM reception apparatus 30 includes antenna elements 31-1 to 31-4, polarized wave separators 32-1 to 32-4, a reception radio unit 33, OAM reception units 34 and 35, and a demodulation processing unit 36 to 39. The polarized wave separators 32-1 to 32-4 may be collectively referred to as "polarized wave separators 32".

The antenna elements 31-1 to 31-4 receive a plurality of radio signals (i.e., spatial multiplexed signals) transmitted from the antenna elements 15-1 to 15-4 of the OAM transmission apparatus 10, respectively, and output the radio signals to the polarized wave separators 32-1 to 32-4, respectively.

The polarized wave separators 32-1 to 32-4 are connected to the antenna elements 31-1 to 31-4, respectively. Each polarized wave separator 32 performs polarization separating on the reception radio signal received from the antenna element 31 into a "vertical component signal" and a "horizontal component signal" and outputs them to the reception radio unit 33. That is, four vertical component signals and four horizontal component signals are output from the polarized wave separators 32-1 to 32-4.

The reception radio unit 33 performs reception radio processing (down conversion, analog-to-digital conversion, etc.) on each of the four vertical component signals and the four horizontal component signals received from the polarized wave separators 32-1 to 32-4. Then, the reception radio unit 33 outputs the four vertical component signals that have been subjected to the reception radio processing to the OAM reception unit 34, and outputs the four horizontal component signals that have been subjected to the reception radio processing to the OAM reception unit 35.

The reception radio unit 33 includes reception radio units 33A-1, 33A-2, 33B-1, 33B-2, 33C-1, 33C-2, 33D-1, and 33D-2. The reception radio units 33A-1 and 33A-2 are connected to the polarized wave separator 32-1. The reception radio units 33B-1 and 33B-2 are connected to the polarized wave separator 32-2. The reception radio units 33C-1 and 33C-2 are connected to the polarized wave separator 32-3. The reception radio units 33D-1 and 33D-2 are connected to the polarized wave separator 32-4. The reception radio units 33A-1, 33B-1, 33C-1, and 33D-1 receive the vertical component signals from the polarized wave separators 32-1 to 32-4, respectively, and perform the reception radio processing. The reception radio units 33A-2, 33B-2, 33C-2, and 33D-2 receive the horizontal component signals from the polarized wave separators 32-1 to 32-4, respectively, and perform the reception radio processing.

The OAM reception unit 34 executes "OAM reception processing" using an "OAM reception weight matrix (first OAM reception weight matrix)" on the four vertical component signals received from the reception radio unit 33. Thus, signals that have been subjected to the OAM reception processing corresponding to the four vertical component signals, i.e., "first mode vertical component reception signals" corresponding to the first OAM mode and "second mode vertical component reception signals" corresponding to the second OAM mode are obtained.

The OAM reception unit 35 executes the "OAM reception processing" using an "OAM reception weight matrix (second OAM reception weight matrix)" on the four horizontal component signals received from the reception radio unit 33. Thus, signals that have been subjected to the OAM reception processing corresponding to the four horizontal component signals, i.e., "first mode horizontal component reception signals" corresponding to the first OAM mode and "second mode horizontal component reception signals" corresponding to the second OAM mode are obtained.

The demodulation processing units 36 to 39 execute demodulation processing on the first mode vertical component reception signal, the second mode vertical component reception signal, the first mode horizontal component reception signal, and the second mode horizontal component reception signal.

The demodulation processing unit 36 includes an interference compensation unit 362. The interference compensation unit 362 uses both the first mode horizontal component reception signal and the second mode horizontal component reception signal to remove an interference component caused by horizontally polarized waves relative to vertically polarized waves from the first mode vertical component reception signal. Thus, not only the inter-polarization interference between the vertical component reception signal and the horizontal component reception signal corresponding to the same OAM mode can be eliminated, but also the inter-polarization interference between the vertical component reception signal and the horizontal component reception signal corresponding to different OAM modes can be eliminated.

The demodulation processing unit 37 includes an interference compensation unit 372. The interference compensation unit 372 uses both the first mode horizontal component reception signal and the second mode horizontal component reception signal to remove an interference component caused by horizontally polarized waves relative to vertically polarized waves from the second mode vertical component reception signal.

The demodulation processing unit 38 includes an interference compensation unit 382. The interference compensation unit 382 uses both the first mode vertical component reception signal and the second mode vertical component reception signal to remove an interference component caused by vertically polarized waves relative to horizontally polarized waves from the first mode horizontal component reception signal.

The demodulation processing unit 39 includes an interference compensation unit 392. The interference compensation unit 392 uses both the first mode vertical component reception signal and the second mode vertical component reception signal to remove an interference component caused by vertically polarized waves relative to horizontally polarized waves from the second mode horizontal component reception signal.

As described above, according to the first example embodiment, the interference compensation unit 362 in the OAM reception apparatus 30 removes the interference component caused by horizontally polarized waves relative to vertically polarized waves from the first mode vertical component reception signal using both the first mode horizontal component reception signal and the second mode horizontal component reception signal.

With the configuration of the OAM reception apparatus 30, it is possible to eliminate not only the inter-polarization interference between the vertical component reception signal and the horizontal component reception signal corresponding to the same OAM mode, but also the inter-polarization interference between the vertical component reception signal and the horizontal component reception signal corresponding to different OAM modes. Thus, it is possible to receive a signal wirelessly transmitted by a combination of OAM mode multiplex transmission and dual polarized wave transmission while compensating the inter-polarization interference. The same can applied to the interference compensation units 372, 382, and 392.

As described above, each radio signal transmitted from the OAM transmission apparatus 10 includes the first OAM mode multiplexed radio signal transmitted by vertically polarized waves and a second OAM mode multiplexed radio signal transmitted by horizontally polarized waves. The first OAM mode multiplexed radio signal and the second OAM mode multiplexed radio signal may be formed using M (M is a natural number greater than or equal to 2) OAM modes from the first OAM mode to the M-th OAM mode. That is, the configuration of the OAM reception apparatus 30 can be expressed as follows. In the OAM reception apparatus 30, the OAM reception unit 34 multiplies the M vertical component reception signals which have been obtained by performing polarization separating and the reception radio processing on the plurality of reception radio signals received by the antenna elements 31-1 to 31-4, by the first OAM reception weight matrix to form M vertical component reception signals from the first vertical component reception signal to the M-th mode vertical component reception signal respectively corresponding to the M OAM modes. The OAM reception unit 35 multiplies the M horizontal component signals which have been obtained by preforming polarization separating and the reception radio processing on the plurality of reception radio signals received by the antenna elements 31-1 to 31-4, by the second OAM reception weight matrix to form M horizontal component reception signals from the first horizontal component reception signal to the M-th mode horizontal component reception signal respectively corresponding to the M OAM modes. The OAM reception apparatus 30 includes M horizontally polarized wave interference compensation units (corresponding to the above interference compensation units 362 and 372) that correspond to the M vertical component reception signals, respectively. The M horizontally polarized wave interference compensation units remove the interference component caused by horizontally polarized waves relative to vertically polarized waves from the corresponding vertically polarized wave reception signals, using the M horizontal component reception signals. The OAM reception apparatus 30 further includes M vertically polarized wave interference compensation units (corresponding to the above interference compensation units 382 and 392) that correspond to the M horizontal component reception signals, respectively. The M vertically polarized wave interference compensation units remove the interference component caused by vertically polarized waves relative to horizontally polarized waves from the corresponding horizontally polarized wave reception signals, using the M vertical component reception signals.

The following modifications can also be made to the OAM reception apparatus 30. For example, in the OAM reception apparatus 30, a functional unit (e.g., Butler matrix) for separating the OAM modes may be disposed at an input stage of the reception radio unit 33 (e.g., between the polarized wave separator 32 and the reception radio unit 33). In this case as well, the OAM reception unit 34 receives the M vertical component reception signals which have been obtained by performing polarization separating and the reception radio processing on the plurality of reception radio signals received by the antenna elements 31-1 to 31-4. Furthermore, in this case as well, the OAM reception unit 35 receives the M horizontal component signals which have been obtained by performing polarization separating and the reception radio processing on the plurality of reception radio signals received by the antenna elements 31-1 to 31-4.

Second Example Embodiment

In the second example embodiment, a more specific configuration of the OAM reception apparatus will be described. A basic configuration of the OAM reception apparatus according to the second example embodiment is the same as that of the OAM reception apparatus 30 according to the first example embodiment.

Configuration Example of OAM Reception Apparatus

Figure 5:
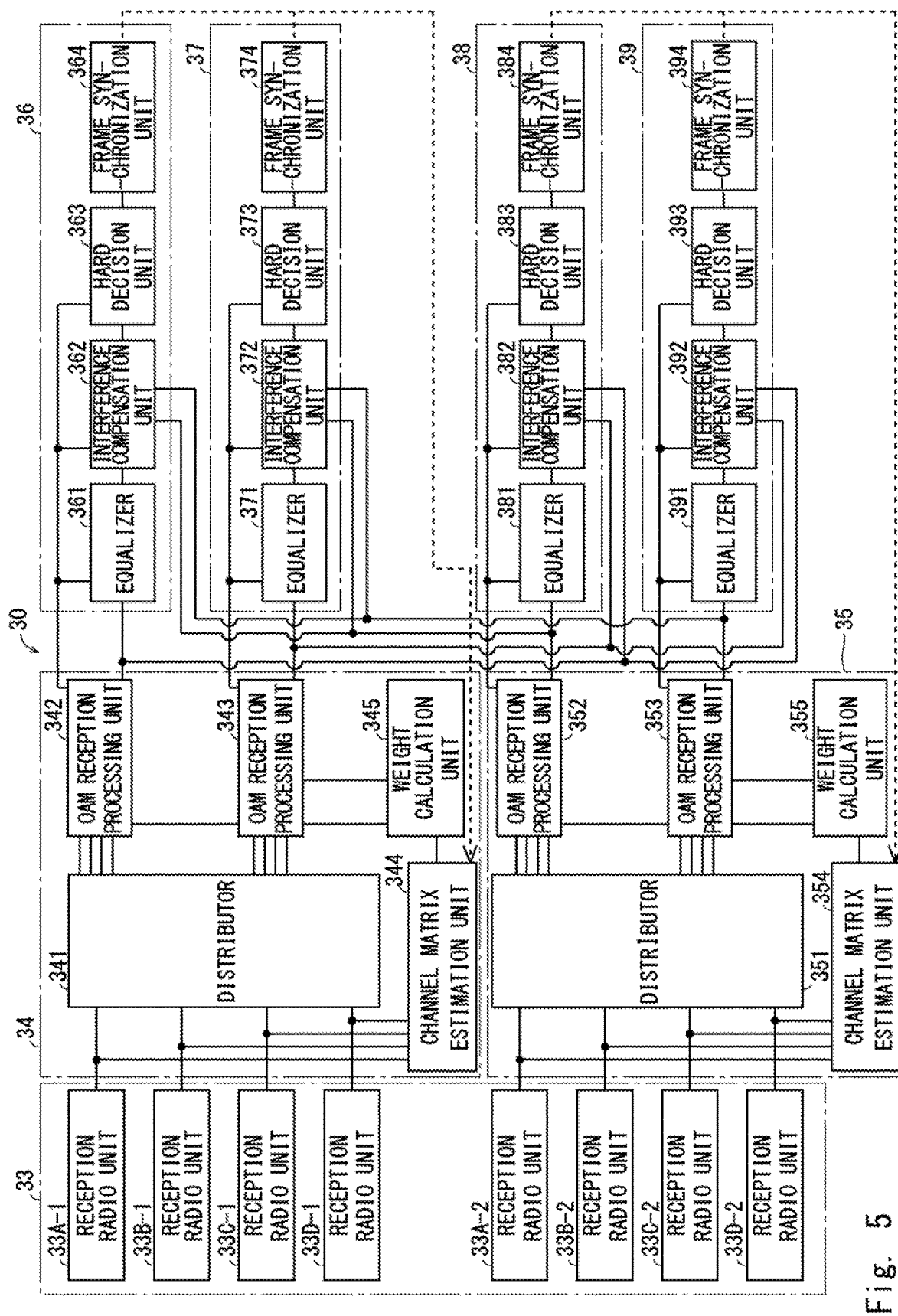
FIG. 5 is a block diagram showing an example of an OAM reception apparatus according to a second example embodiment.

FIG. 5 is a block diagram showing an example of the OAM reception apparatus according to the second example embodiment. FIG. 5 shows a part (reception radio unit 33, OAM reception units 34 and 35, and demodulation processing units 36 to 39) of the OAM reception apparatus 30 according to the second example embodiment, and components other than these are not shown.

The OAM reception unit 34 includes a distributor 341, OAM reception processing units 342 and 343, a channel matrix estimation unit 344, and a weight calculation unit 345. The OAM reception unit 35 includes a distributor 351, OAM reception processing units 352 and 353, a channel matrix estimation unit 354, and a weight calculation unit 355.

The distributor 341 outputs, to the OAM reception processing unit 342 and 343, each of the four signals which have been received around the same time from the reception radio units 33A-1, 33B-1, 33C-1, and 33D-1 and have been subjected to the reception radio processing. That is, the distributor 341 distributes the signal that has been subjected to the radio processing and received from the reception radio unit 33A-1 to the OAM reception processing unit 342 and 343 to be input to the OAM reception processing unit 342 and 343. The same applies to the signals that have been subjected to the reception radio processing and received from the reception radio units 33B-1, 33C-1, and 33D-1. That is, the OAM reception processing unit 342 and 343 receive a reception signal vector composed of four signals that have been subjected to the reception radio processing and received around the same time from the reception radio units 33A-1, 33B-1, 33C-1, and 33D-1.

The channel matrix estimation unit 344 calculates a "channel matrix (first channel matrix)" based on the four vertical component signals that have been subjected to the reception radio processing corresponding to known signals received from the reception radio units 33A-1, 33B-1, 33C-1, and 33D-1 and transmitted by vertically polarized waves from the OAM transmission apparatus 10. The "first channel matrix" is a channel matrix related to channels between the antenna elements 15-1 to 15-4 and antenna elements 31-1 to 31-4. Here, known signal sequences having different patterns are transmitted from the OAM transmission apparatus 10 by the plurality of combinations of the plurality of used OAM modes and vertically and horizontally polarized waves. Thus, the channel matrix estimation unit 344 can separate a plurality of known signal sequences having different patterns from each other, and thus it is possible to calculate a "channel matrix" reflecting the states of the respective combinations of channels.

The weight calculation unit 345 corrects a conjugate transpose matrix of the above "basic weight matrix" based on the channel matrix calculated by the channel matrix estimation unit 344 to calculate an initial value of the "first OAM reception weight matrix". The initial value of the "first OAM reception weight matrix" is set in the OAM reception processing units 342 and 343. The calculation of the channel matrix by the channel matrix estimation unit 344 and the calculation of the initial value of the OAM reception weight matrix by the weight calculation unit 345 will be described later in detail.

The distributor 351 outputs, to the OAM reception processing unit 352 and 353, each of the four signals which have been received around the same time from the reception radio units 33A-2, 33B-2, 33C-2, and 33D-2 and have been subjected to the reception radio processing. That is, the distributor 351 distributes the signal that has been subjected to the radio processing and received from the reception radio unit 33A-2 to the OAM reception processing unit 352 and 353 to be input to the OAM reception processing unit 352 and 353. The same applies to the signals that have been subjected to the reception radio processing and received from the reception radio units 33B-2, 33C-2, and 33D-2. That is, the OAM reception processing unit 352 and 353 receive a reception signal vector composed of four signals that have been subjected to the reception radio processing and received around the same time from the reception radio units 33A-2, 33B-2, 33C-2, and 33D-2.

The channel matrix estimation unit 354 calculates a "channel matrix (second channel matrix)" based on the four horizontal component signals that have been subjected to the reception radio processing corresponding to known signals received from the reception radio units 33A-2, 33B-2, 33C-2, and 33D-2 and transmitted by horizontally polarized waves from the OAM transmission apparatus 10. The "second channel matrix" is a channel matrix related to channels between the antenna elements 15-1 to 15-4 and antenna elements 31-1 to 31-4. Here, known signal sequences having different patterns are transmitted from the OAM transmission apparatus 10 by the plurality of combinations of the plurality of used OAM modes and vertically and horizontally polarized waves. Thus, the channel matrix estimation unit 354 can separate a plurality of known signal sequences having different patterns from each other, and thus it is possible to calculate a "channel matrix" reflecting the states of the respective combinations of channels.

The weight calculation unit 355 calculates an initial value of the "second OAM reception weight matrix" based on the channel matrix calculated by the channel matrix estimation unit 354. The initial value of the "second OAM reception weight matrix" is set in the OAM reception processing units 352 and 353. In order to calculate the channel matrix by the channel matrix estimation unit 354 and the initial value of the OAM reception weight matrix by the weight calculation unit 355, a method of correcting the conjugate transpose matrix of the above "basic weight matrix" to calculate the initial value may be used in addition to methods such as Zero Forcing and Mean Minimum Square Error. The correction method will be described in detail later.

The OAM reception processing units 342 and 343 correspond to two row vectors (i.e., first OAM reception weight vector and second OAM reception weight vector) of the "first OAM reception weight matrix", respectively. That is, the OAM reception processing units 342 and 343 correspond to the two used OAM modes, respectively. Here, the OAM reception processing units 342 and 343 correspond to mode 0 and mode 1, respectively.

The OAM reception processing unit 342 multiplies the input reception signal vector by the first OAM reception weight vector to execute the "OAM reception processing". By doing so, a "first mode vertical component reception signal $A11k$" described above is obtained. The OAM reception processing unit 343 multiplies the reception signal vector by the second OAM reception weight vector to execute the "OAM reception processing". By doing so, a "second mode vertical component reception signal $A12k$" described above is obtained. Here, the OAM reception processing unit 342 executes the "OAM reception processing" while adjusting (updating) the "first OAM reception weight vector" based on a "first error vector signal" received from a hard decision unit 363 described later. Further, the OAM reception processing unit 343 executes the "OAM reception processing" while adjusting (updating) the "second OAM reception weight vector" based on a "second error vector signal" received from a hard decision unit 373 described later. Thus, adaptive OAM reception processing can be performed.

The OAM reception processing units 352 and 353 correspond to two row vectors (i.e., third OAM reception weight vector and fourth OAM reception weight vector) of the "second OAM reception weight matrix", respectively. That is, the OAM reception processing units 352 and 353 correspond to the two used OAM modes. Here, the OAM reception processing units 352 and 353 correspond to mode 0 and mode 1, respectively.

The OAM reception processing unit 352 multiplies the input reception signal vector by the third OAM reception weight vector to execute the "OAM reception processing". Thus, a "first mode horizontal component reception signal A21k" described above is obtained. The OAM reception processing unit 353 multiplies the reception signal vector by the fourth OAM reception weight vector to execute "OAM reception processing". Thus, a "second mode horizontal component reception signal A22k" described above is obtained. Here, the OAM reception processing unit 352 executes the "OAM reception processing" while adjusting (updating) the "third OAM reception weight vector" based on a "third error vector signal" received from a hard decision unit 383 described later. Further, the OAM reception processing unit 353 executes the "OAM reception processing" while adjusting (updating) the "fourth OAM reception weight vector" based on a "fourth error vector signal" received from a hard decision unit 393 described later. Thus, adaptive OAM reception processing can be performed.

Figure 6:
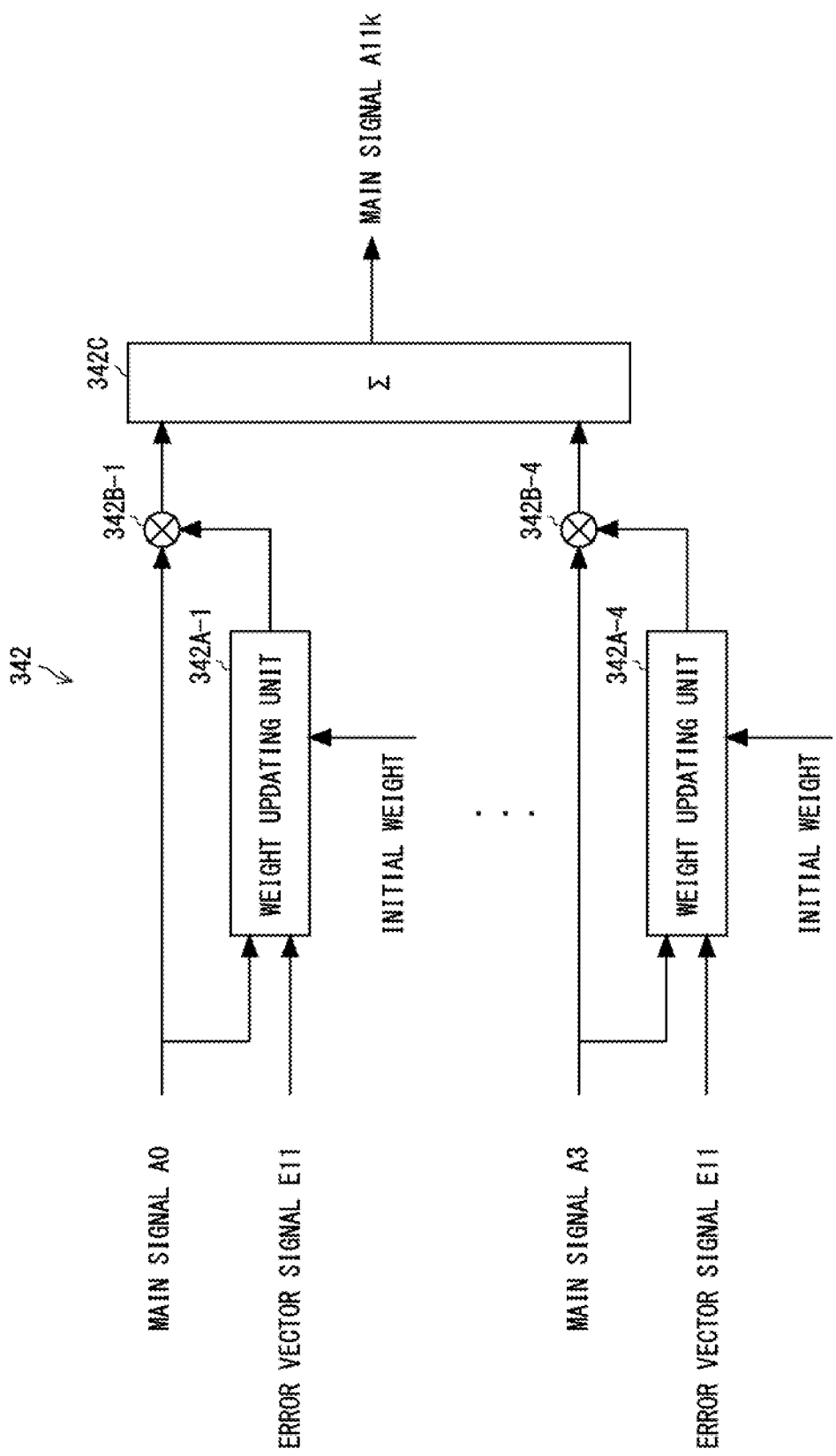
FIG. 6 is a block diagram showing an example of an OAM reception processing unit in the OAM reception apparatus according to the second example embodiment.

FIG. 6 is a block diagram showing an example of the OAM reception processing unit in the OAM reception apparatus according to the second example embodiment. In FIG. 6, the OAM reception processing unit 342 includes weight updating units 342A-1 to 342A-4, multipliers 342B-1 to 342B-4, and an adder 342C. In FIG. 6, the main signals A0, A1, A2, and A3 are signals output from the reception radio units 33A-1 to 33D-1, respectively. An error vector signal E11 represents a first error vector signal output from the hard decision unit 363 described later. An initial weight is an initial value of the "first OAM reception weight vector" calculated by the weight calculation unit 345.

The main signals A0, A1, A2, and A3 are input to the weight updating units 342A-1 to 342A-4, respectively. For example, the weight updating unit 342A-1 updates an OAM reception weight held by the weight updating unit 342A-1 based on the main signal A0 and the error vector signal E11, and outputs the updated OAM reception weight to the multiplier 342B-1. Likewise, the weight updating units 342A-2 to 342A-4 output the updated OAM reception weights to the multipliers 342B-2 to 342B-4, respectively.

The multipliers 342B-1 to 342B-4 receive the main signals A0, A1, A2, and A3, respectively. The multipliers 342B-1 to 342B-4 receive updated OAM reception weights from the weight updating units 342A-1 to 342A-4. Each multiplier 342B multiplies the input main signal by the OAM reception weight and outputs the multiplication result to the adder 342C.

The adder 342C adds the four multiplication results received from the multipliers 342B-1 to 342B-4, and outputs the addition result as a signal (i.e., first mode vertical component reception signal A11k) that has been subjected to the OAM reception processing.

Figure 7:
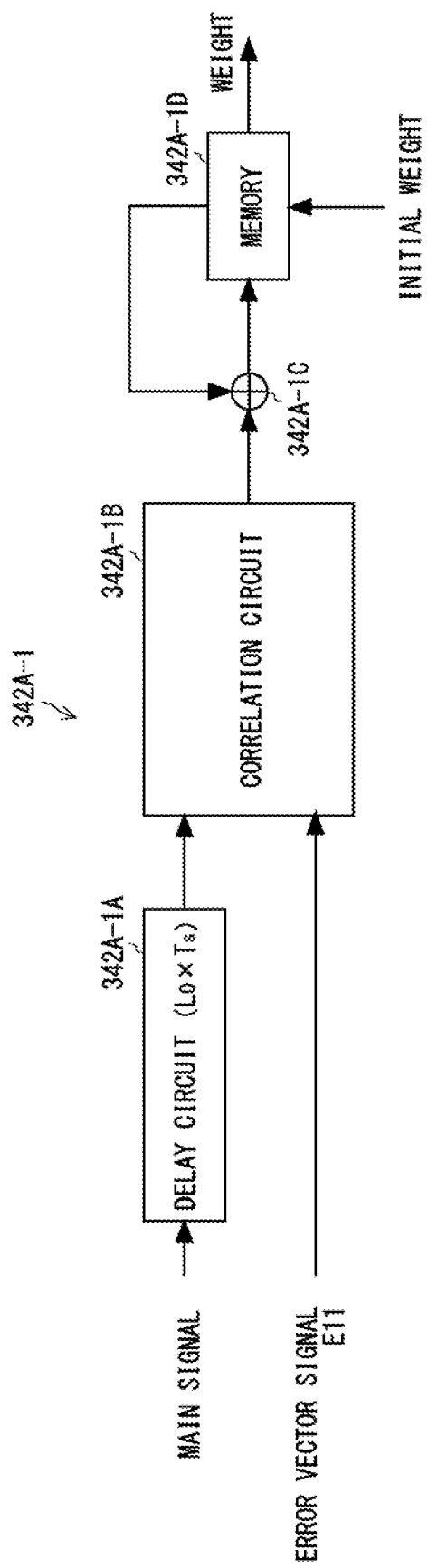
FIG. 7 is a block diagram showing an example of a weight updating unit.

FIG. 7 is a block diagram showing an example of the weight updating unit. Since the configurations of the weight updating units 342A-1 to 342A-4 are the same, the configuration of the weight updating unit 342A-1 is shown in FIG. 7 as an example. In FIG. 7, the weight updating unit 342A-1 includes a delay circuit 342A-1A, a correlation circuit 342A-1B, an adder 342A-1C, and a memory 342A-1D.

The delay circuit 342A-1A holds the input main signal for a period of time ($L_0 \times Ts$) and then outputs the main signal. In other words, the delay circuit 342A-1A delays the input main signal by the time ($L_0 \times Ts$). The time ($L_0 \times Ts$) corresponds to a time required until the error vector signal E11 corresponding to the main signal at a certain timing is fed back (i.e., feedback delay time). Ts represents a symbol time. $L_0$ represents the number of symbol times Ts included in the feedback delay time. That is, since the delay circuit 342A-1A delays the main signal by the feedback delay time, the main signal and the error vector signal E11 corresponding to the main signal are input to the correlation circuit 342A-1B around the same time.

The correlation circuit 342A-1B calculates a correlation value using the main signal and the error vector signal E11, and outputs the calculated correlation value to the adder 342A-1C.

The adder 342A-1C adds the correlation value received from the correlation circuit 342A-1B and a weight received from the memory 342A-1D, and outputs the addition result to the memory 342A-1D.

The memory 342A-1D outputs the weight (holding weight) held by the memory 342A-1D to the adder 342A-1C, updates the holding weight according to the addition result received from the adder 342A-1C, and outputs the updated holding weight to the multiplier 342B-1. The initial weight calculated by the weight calculation unit 345 is first held in the memory 342A-1D, and the initial weight is updated.

Each of the OAM reception processing units 343, 352, and 353 has the same configuration as that of the OAM reception processing unit 342. However, the initial value of the "second OAM reception weight vector" calculated by the weight calculation unit 345 and a second error vector signal E12 output from the hard decision unit 373 described later are input to the OAM reception processing unit 343. The signals output from the reception radio units 33A-2 to 33D-2 are input to the OAM reception processing units 352 and 353 as the main signals A0, A1, A2, and A3, respectively. An initial value of the "third OAM reception weight vector" calculated by the weight calculation unit 355 and a third error vector signal E21 output from the hard decision unit 383 described later are input to the OAM reception processing unit 352. An initial value of the "fourth OAM reception weight vector" calculated by the weight calculation unit 355 and a fourth error vector signal E22 output from the hard decision unit 393 described later are input to the OAM reception processing unit 353.

As described above, the OAM reception weight vectors are updated by the correlations between the main signals and the error vector signals in the OAM reception processing unit 342, 343, 352, and 353.

Returning to the description of FIG. 5, the demodulation processing unit 36 includes the interference compensation unit 362, an equalizer 361, the hard decision unit 363, and a frame synchronization unit 364. The demodulation processing unit 37 includes the interference compensation unit 372, an equalizer 371, the hard decision unit 373, and a frame synchronization unit 374. The demodulation processing unit 38 includes the interference compensation unit 382, an equalizer 381, the hard decision unit 383, and a frame synchronization unit 384. The demodulation processing unit 39 includes the interference compensation unit 392, an equalizer 391, the hard decision unit 393, and a frame synchronization unit 394.

The equalizer 361 outputs, to the interference compensation unit 362, a first mode vertical component reception signal B11k that has been subjected to distortion component removal processing for removing a distortion component from the signal obtained by the OAM reception processing unit 342 (i.e., the first mode vertical component reception signal A11k). For example, the equalizer 361 filters the first mode vertical component reception signal A11k using a plurality of filter coefficients (hereinafter sometimes referred to as "a plurality of first filter coefficients") to eliminate the distortion component. Here, the equalizer 361 executes the distortion component removal processing while adjusting (updating) the plurality of first filter coefficients based on the "first error vector signal E11" received from the hard decision unit 363 described later.

The equalizer 371 outputs, to the interference compensation unit 372, a second mode vertical component reception signal B12k that has been subjected to the distortion component removal processing for removing a distortion component from the signal obtained by the OAM reception processing unit 343 (i.e., the second mode vertical component reception signal A12k). For example, the equalizer 371 filters the second mode vertical component reception signal A12k using a plurality of filter coefficients (hereinafter sometimes referred to as "a plurality of second filter coefficients") to eliminate the distortion component. Here, the equalizer 371 executes the distortion component removal processing while adjusting (updating) the plurality of second filter coefficients based on the "second error vector signal E12" received from the hard decision unit 373 described later.

The equalizer 381 outputs, to the interference compensation unit 382, a first mode horizontal component reception signal B21k that has been subjected to the distortion component removal processing for removing a distortion component from the signal obtained by the OAM reception processing unit 352 (i.e., the first mode horizontal component reception signal A21k). For example, the equalizer 381 filters the first mode horizontal component reception signal A21k using a plurality of filter coefficients (hereinafter sometimes referred to as "a plurality of third filter coefficients") to eliminate the distortion component. Here, the equalizer 381 executes the distortion component removal processing while adjusting (updating) the plurality of third filter coefficients based on the "third error vector signal E21" received from the hard decision unit 383 described later.

The equalizer 391 outputs, to the interference compensation unit 392, a second mode vertical component reception signal B22k that has been subjected to distortion component removal processing for removing a distortion component from the signal obtained by the OAM reception processing unit 353 (i.e., the second mode horizontal component reception signal A22k). For example, the equalizer 391 filters the second mode horizontal component reception signal A22k using a plurality of filter coefficients (hereinafter referred to as "a plurality of fourth filter coefficients") to eliminate distortion components. Here, the equalizer 391 executes the distortion component removal processing while adjusting (updating) the plurality of fourth filter coefficients based on the "fourth error vector signal E22" received from the hard decision unit 393 described later.

Figure 8:
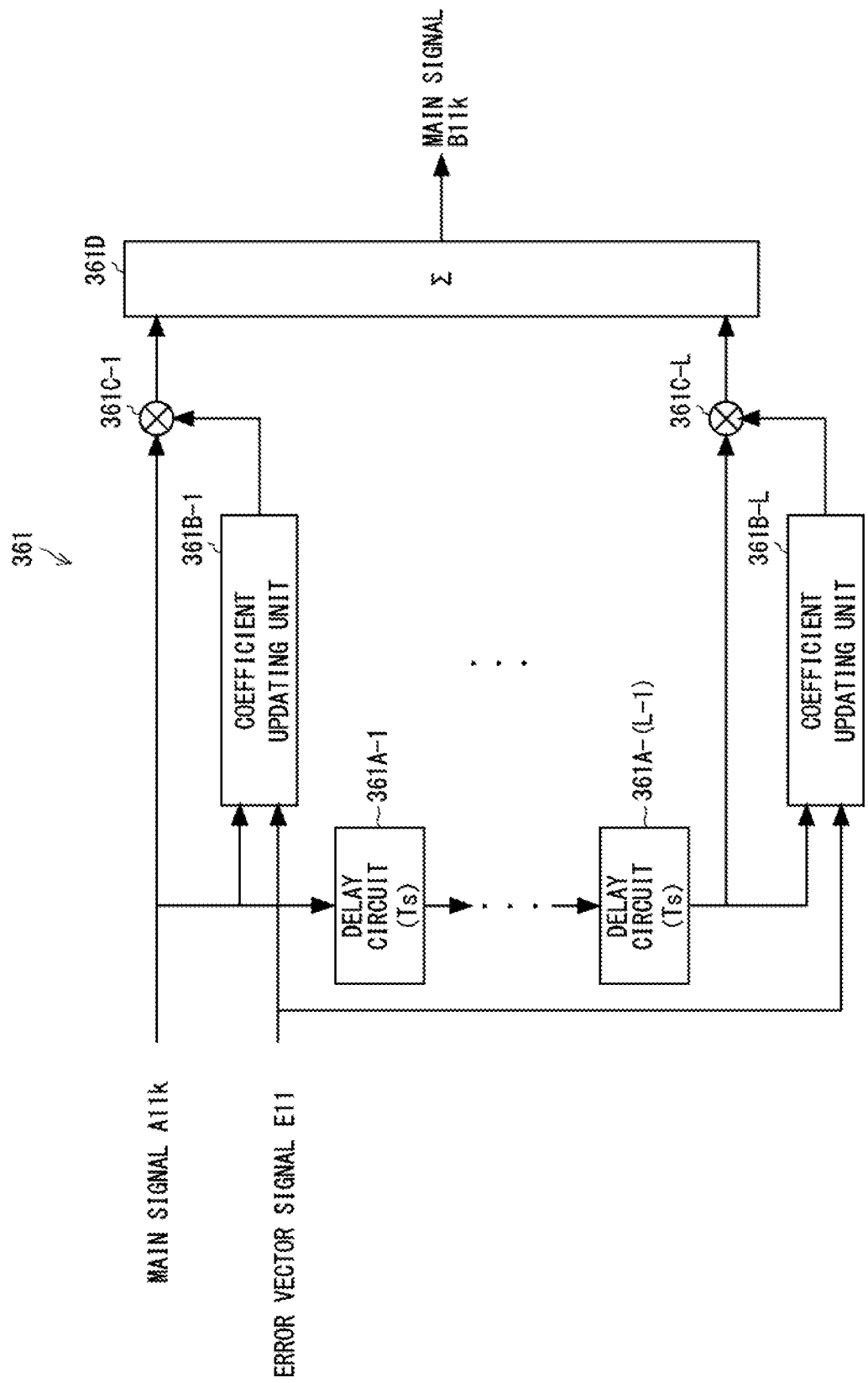
FIG. 8 is a block diagram showing an example of an equalizer in the OAM reception apparatus according to the second example embodiment.

FIG. 8 is a block diagram showing an example of the equalizer in the OAM reception apparatus according to the second example embodiment. In FIG. 8, the equalizer 361 includes delay circuits 361A-1 to 361A-(L−1), coefficient updating units 361B-1 to 361B-L, multipliers 361C-1 to 361C-L, and an adder 361D. In FIG. 8, the main signal A11k is a signal that has been subjected to the OAM reception processing (i.e., the first mode vertical component reception signal A11k) output from the OAM reception processing unit 342. The error vector signal E11 represents the first error vector signal E11 output from the hard decision unit 363 described later.

Each of the delay circuits 361A-1 to 361A-(L−1) delays the input main signal A11k by a time Ts and outputs the delayed signal. The delay circuits 361A-1 to 361 A-(L−1) are disposed in the input stages of the coefficient updating units 361B-2 to 361B-L, respectively. As a result, L main signals A11k shifted by the time Ts are input to the coefficient updating units 361B-1 to 361B-L around the same time.

Each of the coefficient updating units 361B updates the filter coefficient held by the corresponding coefficient updating unit 361B based on the input main signal A11k and the error vector signal E11, and outputs the updated filter coefficient to the multiplier 361C.

Each of the multipliers 361C multiplies the main signal A11k by the filter coefficient and outputs the multiplication result to the adder 361D.

The adder 361D adds the L multiplication results received from the multipliers 361C-1 to 361C-L, and outputs the addition result as the equalized signal B11k. As described above, the equalizer 361 is, for example, a FIR (Finite Impulse Response) filter.

Figure 9:
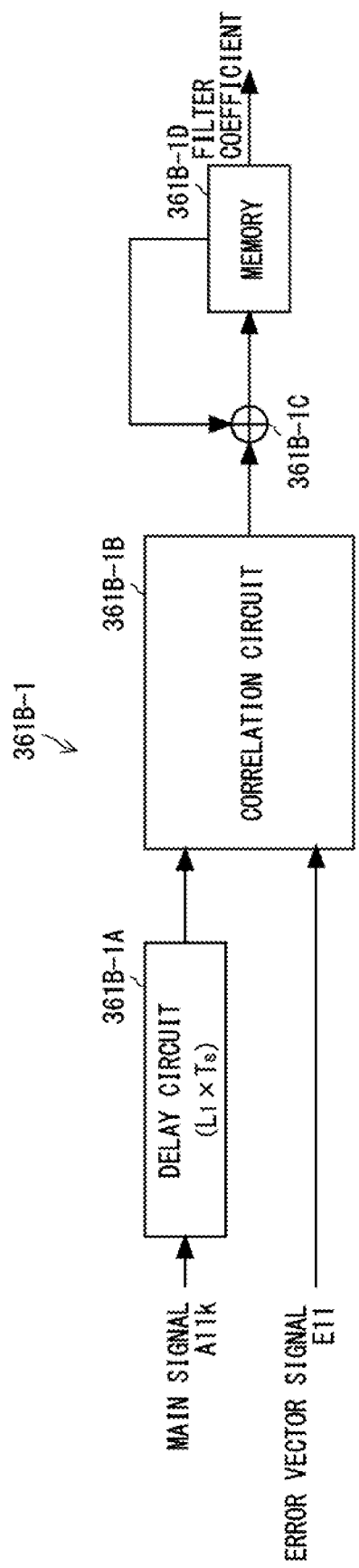
FIG. 9 is a block diagram showing an example of a coefficient updating unit.

FIG. 9 is a block diagram showing an example of the coefficient updating unit. Since the configurations of the coefficient updating units 361B-1 to 361B-L are the same, the configuration of the coefficient updating unit 361B-1 is shown in FIG. 9 as an example. In FIG. 9, the coefficient updating unit 361B-1 includes a delay circuit 361B-1A, a correlation circuit 361B-1B, an adder 361B-1C, and a memory 361B-1D. In FIG. 9, a main signal A11k is the first mode vertical component reception signal. The error vector signal E11 represents the first error vector signal output from the hard decision unit 363 described later.

The delay circuit 361B-1A holds the input main signal A11k for a period of time ($L_1$×Ts) and then outputs the main signal A11k. In other words, the delay circuit 361B-1A delays the input main signal A11k by the time ($L_1$×Ts). The time ($L_1$×Ts) corresponds to a time required until the error vector signal E11 corresponding to the main signal A11k at a certain timing is fed back (i.e., feedback delay time). $L_1$ represents the number of symbol times Ts included in the feedback delay time. That is, since the delay circuit 361B-1A delays the main signal A11k by the feedback delay time, the main signal A11k and the error vector signal E11 corresponding to the main signal A11k are input to the correlation circuit 361B-1B around the same time.

The correlation circuit 361B-1B calculates a correlation value using the main signal A11k and the error vector signal E11, and outputs the calculated correlation value to the adder 361B-1C.

The adder 361B-1C adds the correlation value received from the correlation circuit 361B-1B and the filter coefficient received from the memory 361B-1D, and outputs the addition result to the memory 361B-1D.

The memory 361B-1D outputs the filter coefficient (holding filter coefficient) held by the memory 361B-1D to the adder 361B-1C, updates the holding filter coefficient according to the addition result received from the adder 361B-1C, and outputs the updated holding filter coefficient to the multiplier 361C-1.

The equalizers 371, 381, and 391 have the same configuration as that of the equalizer 361. However, the equalizer 371 receives the second mode vertical component reception signal A12k as the main signal A12k and receives the second error vector signal E12 as the error vector signal E12. The equalizer 381 receives the first mode horizontal component reception signal A21$k$ as the main signal A21$k$, and receives a third error vector signal E21$k$ as the error vector signal E21$k$. Further, the equalizer 371 receives the second mode horizontal component reception signal A22$k$ as the main signal A22$k$, and receives the fourth error vector signal E22 described later as the error vector signal E22.

As described above, in the equalizers 361, 371, 381, and 391, the filter coefficient is updated by the correlation between the main signal and the error vector signal.

Returning to the description of FIG. 5, the interference compensation unit 362 uses both the first mode horizontal component reception signal A21$k$ and the second mode horizontal component reception signal A22$k$ to remove an interference component caused by horizontally polarized waves relative to vertically polarized waves from the first mode vertical component reception signal B11$k$ that has been subjected to the distortion component removal processing. For example, the interference compensation unit 362 filters the first mode horizontal component reception signal A21$k$ using a plurality of filter coefficients (hereinafter sometimes referred to as "a plurality of fifth filter coefficients") to form "a first horizontal interference component replica". The interference compensation unit 362 filters the second mode horizontal component reception signal A22$k$ using a plurality of filter coefficients (hereinafter sometimes referred to as "a plurality of sixth filter coefficients") to form a "second horizontal interference component replica". The "first horizontal interference component replica" and "second horizontal interference component replica" are replicas of interference components due to the horizontally polarized waves relative to the vertically polarized waves. Then, the interference compensation unit 362 subtracts the "first horizontal interference component replica" and the "second horizontal interference component replica" from the first mode vertical component reception signal B11$k$ that have been subject to the distortion component removal processing to form a first mode vertical component reception signal C11$k$ that has been subjected to the interference compensation processing. Here, the interference compensation unit 362 executes the interference compensation processing while adjusting (updating) the plurality of fifth filter coefficients and the plurality of sixth filter coefficients based on the "first error vector signal E11" received from the hard decision unit 363 described later. Thus, adaptive interference compensation processing can be performed.

The interference compensation unit 372 uses both the first mode horizontal component reception signal A21$k$ and the second mode horizontal component reception signal A22$k$ to remove an interference component caused by horizontally polarized waves relative to vertically polarized waves from the second mode vertical component reception signal B12$k$ that has been subjected to the distortion component removal processing. For example, the interference compensation unit 372 filters the first mode horizontal component reception signal A21$k$ using a plurality of filter coefficients (hereinafter sometimes referred to as "a plurality of seventh filter coefficients") to form "a third horizontal interference component replica". The interference compensation unit 372 filters the second mode horizontal component reception signal A22$k$ using a plurality of filter coefficients (hereinafter sometimes referred to as "a plurality of eighth filter coefficients") to form a "fourth horizontal interference component replica". The "third horizontal interference component replica" and "fourth horizontal interference component replica" are replicas of interference components due to the horizontally polarized waves relative to the vertically polarized waves. Then, the interference compensation unit 372 subtracts the "third horizontal interference component replica" and the "fourth horizontal interference component replica" from the second mode vertical component reception signal B12$k$ that have been subject to the distortion component removal processing to form a second mode vertical component reception signal C12$k$ that has been subjected to the interference compensation processing. Here, the interference compensation unit 372 executes the interference compensation processing while adjusting (updating) the plurality of seventh filter coefficients and the plurality of eighth filter coefficients based on the "second error vector signal E12" received from the hard decision unit 373 described later.

The interference compensation unit 382 uses both the first mode vertical component reception signal A11$k$ and the second mode vertical component reception signal A12$k$ to remove the interference component due to the horizontally polarized waves relative to the vertically polarized waves from the first mode horizontal component reception signal B21$k$ that has been subjected to the distortion component removal processing. For example, the interference compensation unit 382 filters the first mode vertical component reception signal A11$k$ using a plurality of filter coefficients (hereinafter sometimes referred to as "a plurality of ninth filter coefficients") to form "a first vertical interference component replica". The interference compensation unit 382 filters the second mode vertical component reception signal A12$k$ using a plurality of filter coefficients (hereinafter sometimes referred to as "a plurality of tenth filter coefficients") to form a "second vertical interference component replica". The "first vertical interference component replica" and "second vertical interference component replica" are replicas of interference components due to the horizontally polarized waves relative to the vertically polarized waves. Then, the interference compensation unit 382 subtracts the "first vertical interference component replica" and the "second vertical interference component replica" from the first mode horizontal component reception signal B21$k$ that have been subject to the distortion component removal processing to form a first mode horizontal component reception signal C21$k$ that has been subjected to the interference compensation processing. Here, the interference compensation unit 382 executes the interference compensation processing while adjusting (updating) the plurality of ninth filter coefficients and the plurality of tenth filter coefficients based on the "third error vector signal E21" received from the hard decision unit 383 described later.

The interference compensation unit 392 uses both the first mode vertical component reception signal A11$k$ and the second mode vertical component reception signal A12$k$ to remove an interference component caused by horizontally polarized waves relative to vertically polarized waves from the second mode horizontal component reception signal B22$k$ that has been subjected to the distortion component removal processing. For example, the interference compensation unit 392 filters the first mode vertical component reception signal A11$k$ using a plurality of filter coefficients (hereinafter sometimes referred to as "a plurality of eleventh filter coefficients") to form "a third vertical interference component replica". The interference compensation unit 392 filters the second mode vertical component reception signal A12$k$ using a plurality of filter coefficients (hereinafter sometimes referred to as "a plurality of twelfth filter coefficients") to form a "fourth vertical interference component replica". The "third vertical interference component replica" and "fourth vertical interference component replica" are replicas of interference components due to the horizontally polarized waves relative to the vertically polarized waves. Then, the interference compensation unit 392 subtracts the "third vertical interference component replica" and the "fourth vertical interference component replica" from the second mode horizontal component reception signal B22$k$ that have been subject to the distortion component removal processing to form a second mode horizontal component reception signal C22$k$ that has been subjected to the interference compensation processing. Here, the interference compensation unit 392 executes the interference compensation processing while adjusting (updating) the plurality of eleventh filter coefficients and the plurality of twelfth filter coefficients based on the "fourth error vector signal E22" received from the hard decision unit 393 described later.

Figure 10:
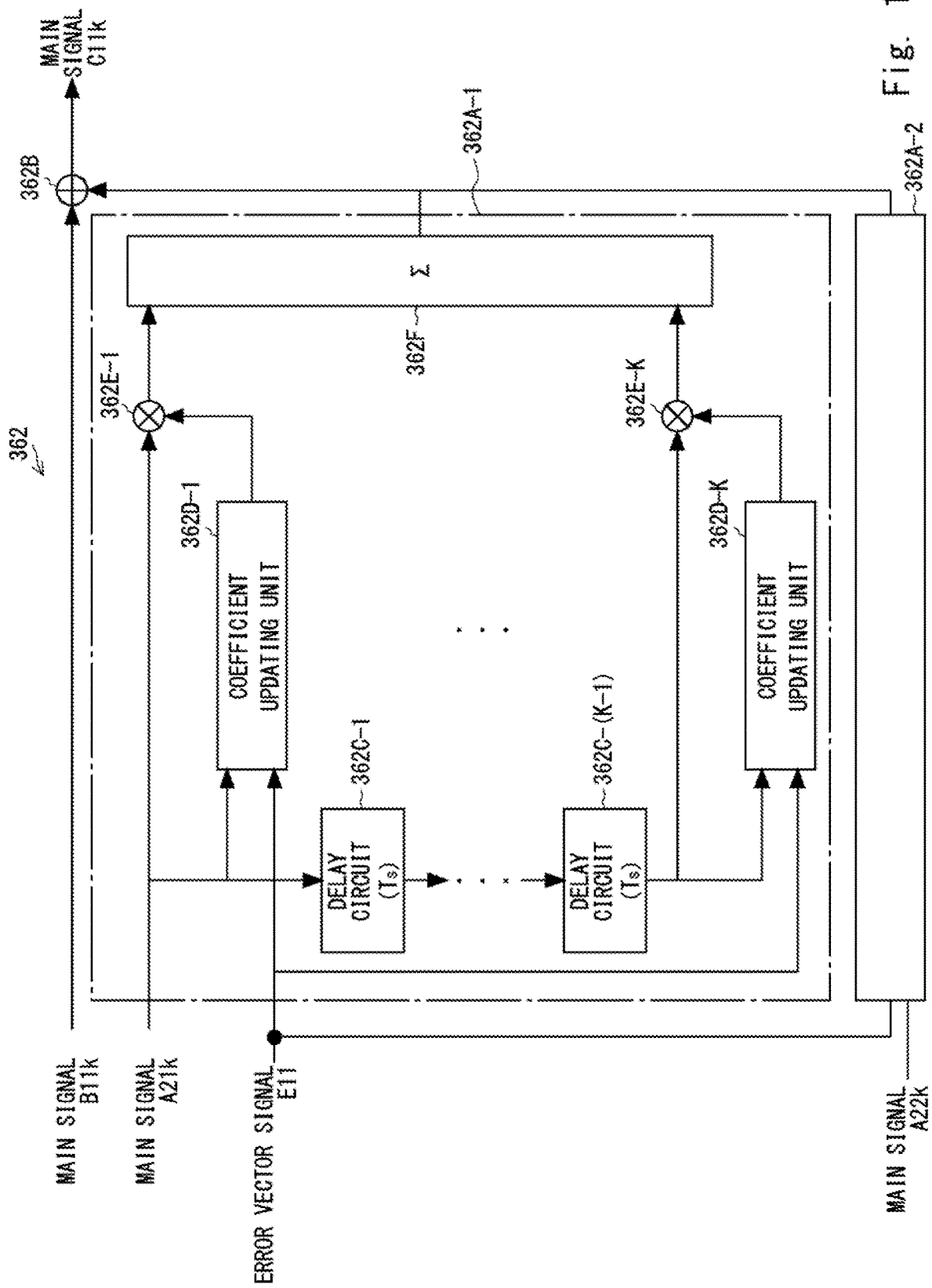
FIG. 10 is a block diagram showing an example of an interference compensation unit in the OAM reception apparatus according to the second example embodiment.

FIG. 10 is a block diagram showing an example of an interference compensation unit in the OAM reception apparatus according to the second example embodiment. In FIG. 10, the interference compensation unit 362 includes interference component replica forming units 362A-1 and 362A-2 and an adder (subtracter) 362B. In FIG. 10, the main signal B11$k$ is the first mode vertical component reception signal B11$k$ that has been subjected to the distortion component removal processing output from the equalizer 361. The main signal A21$k$ is the first mode horizontal component reception signal A21$k$ output from the OAM reception processing unit 352. The main signal A22$k$ is the second mode horizontal component reception signal A22$k$ output from the OAM reception processing unit 353. The error vector signal E11 represents the first error vector signal E11 output from the hard decision unit 363 described later.

The interference component replica forming unit 362A-1 forms the first horizontal interference component replica by filtering the first mode horizontal component reception signal A21$k$ using a plurality of filter coefficients. The interference component replica forming unit 362A-2 forms the second horizontal interference component replica by filtering the second mode horizontal component reception signal A22$k$ using a plurality of filter coefficients.

The adder (subtracter) 362B subtracts the first horizontal interference component replica and the second horizontal interference component replica from the main signal B11$k$, and outputs the first mode vertical component reception signal C11$k$ that has been subjected to the interference compensation processing.

As shown in FIG. 10, for example, the interference component replica forming unit 362A-1 includes delay circuits 362C-1 to 362 C-(K−1), coefficient updating units 362D-1 to 362D-K, multipliers 362E-1 to 362E-K, and an adder 362F. The interference component replica forming unit 362A-2 has the same configuration as that of the interference component replica forming unit 362A-1. However, the main signal A21$k$ is input to the interference component replica forming unit 362A-2 in place of the main signal A22$k$.

Each of the delay circuits 362C-1 to 362 C-(K−1) delays the input main signal A21$k$ by a time Ts and outputs the delayed signal. The delay circuits 362C-1 to 362 C-(K−1) are disposed in the input stages of the coefficient updating units 362D-2 to 362D-K, respectively. Thus, M main signals A21$k$ shifted by the time Ts are input to the coefficient updating units 362D-1 to 362D-K around the same time.

Each coefficient updating unit 362D updates the filter coefficient held by each coefficient updating unit 362D based on the input main signal A21$k$ and the error vector signal E11, and outputs the updated filter coefficient to the multiplier 362E.

Each multiplier 362E multiplies the main signal A21$k$ by the filter coefficient and outputs the multiplication result to the adder 362F.

The adder 362F adds the K multiplication results received from the multipliers 362E-1 to 362E-K, and outputs the addition result as the first horizontal interference component replica. As described above, the interference component replica forming unit 362A-1 is, for example, an FIR (Finite Impulse Response) filter.

Figure 11:
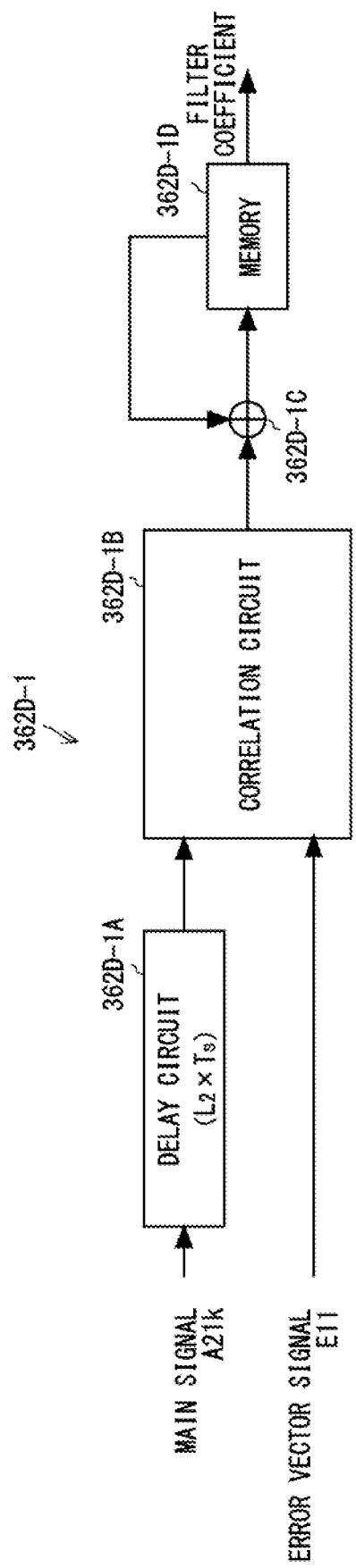
FIG. 11 is a block diagram showing an example of a coefficient updating unit.

FIG. 11 is a block diagram showing an example of the coefficient updating unit. Since the configuration of the coefficient updating units 362D-1 to 362D-K is the same, the configuration of the coefficient updating unit 362D-1 is shown in FIG. 11 as an example. In FIG. 11, the coefficient updating unit 362D-1 includes a delay circuit 362D-1A, a correlation circuit 362D-1B, an adder 362D-1C, and a memory 362D-1D. In the coefficient updating unit 362D-1 of the interference component replica forming unit 362A-1, the main signal A21$k$ is the first mode horizontal component reception signal A21$k$, and in the coefficient updating unit 362D-1 of the interference component replica forming unit 362A-2, the main signal A22$k$ is the second mode horizontal component reception signal A22$k$. The error vector signal E11 represents the first error vector signal E11 output from the hard decision unit 363 described later.

The delay circuit 362D-1A holds the input main signal A21$k$ for a period of time ($L_2 \times$Ts) and then outputs the main signal A21$k$. In other words, the delay circuit 362D-1A delays the input main signal A21$k$ by the time ($L_2 \times$Ts). The time ($L_2 \times$Ts) corresponds to the time (i.e., feedback delay time) required until the error vector signal E11 corresponding to the main signal B11$k$ at a certain timing is fed back. $L_2$ represents the number of symbol times Ts included in the feedback delay time. That is, since the delay circuit 362D-1A delays the main signal A21$k$ by the feedback delay time, the main signal A21$k$ and the error vector signal E11 corresponding to the main signal B11$k$, which is input around the same time as the main signal A21$k$, are input to the correlation circuit 362D-1B around the same time.

The correlation circuit 362D-1B calculates a correlation value using the main signal A21$k$ and the error vector signal E11, and outputs the calculated correlation value to the adder 362D-1 C.

The adder 362D-1C adds the correlation value received from the correlation circuit 362D-1B and the filter coefficient received from the memory 362D-1D, and outputs the addition result to the memory 362D-1D.

The memory 362D-1D outputs the filter coefficient (holding filter coefficient) held by the memory 362D-1D to the adder 362D-1C, updates the holding filter coefficient according to the addition result received from the adder 362D-1C, and outputs the updated holding filter coefficient to the multiplier 362E-1.

The interference compensation unit 372, 382, and 392 have the same configuration as that of the interference compensation unit 362. However, the interference compensation unit 372 receives the second mode vertical component reception signal B12$k$ that has been subjected to the distortion component removal processing as the main signal B12$k$, and receives the second error vector signal E12 as the error vector signal E12. The interference compensation unit 382 receives the first mode horizontal component reception signal B21$k$ that has been subjected to the distortion component removal processing as the main signal B21$k$, and receives the third error vector signal E21 as the error vector signal E21. The interference compensation unit 382 receives the first mode vertical component reception signal A11$k$ and the second mode vertical component reception signal A12$k$ as the main signals A11$k$ and A11$k$. Further, the interference compensation unit 392 receives the second mode horizontal component reception signal B22$k$ that has been subjected to the distortion component removal processing as the main signal B22$k$ and the fourth error vector signal E22 as the error vector signal E22. The interference compensation unit 392 receives the first mode vertical component reception signal A11$k$ and the second mode vertical component reception signal A12$k$ as the main signals A11$k$ and A12$k$.

As described above, the interference compensation units 362, 372, 382, and 392 update the filter coefficients by the correlations between the main signals and the error vector signals.

Returning to the description of FIG. 5, the hard decision unit 363 specifies a "first symbol" based on a reception signal point (hereinafter sometimes referred to as a "first reception signal point") on the constellation corresponding to the first mode vertical component reception signal C11$k$, which is obtained by the interference compensation unit 362 and has been subjected to the interference compensation processing. For example, the hard decision unit 363 specifies a symbol closest to a "first reception signal point" as the "first symbol", from among a plurality of symbols on the constellation corresponding to the modulation method (PSK (phase-shift keying), QAM (quadrature amplitude modulation), etc.) used in the OAM transmission apparatus 10. Then, the hard decision unit 363 outputs, for example, a difference vector between the "first reception signal point" and the "first symbol" as a "first error vector signal E11" indicating a difference between the "first reception signal point" and the "first symbol".

In a manner similar to the hard decision unit 363, the hard decision unit 373 specifies a "second symbol" based on a reception signal point (hereinafter sometimes referred to as a "second reception signal point") on the constellation corresponding to the second mode vertical component reception signal C12$k$, which is obtained by the interference compensation unit 372 and has been subjected to the interference compensation processing. Then, the hard decision unit 373 outputs, for example, a difference vector between the "second reception signal point" and the "second symbol" as the "second error vector signal E12" indicating a difference between the "second reception signal point" and the "second symbol".

In a manner similar to the hard decision unit 363, the hard decision unit 383 specifies a "third symbol" based on a reception signal point (hereinafter sometimes referred to as a "third reception signal point") on the constellation corresponding to the first mode horizontal component reception signal C21$k$, which is obtained by the interference compensation unit 382 and has been subjected to the interference compensation processing. Then, the hard decision unit 383 outputs, for example, a difference vector between the "third reception signal point" and the "third symbol" as the "third error vector signal E21" indicating a difference between the "third reception signal point" and the "third symbol".

In a manner similar to the hard decision unit 363, the hard decision unit 393 specifies a "fourth symbol" based on a reception signal point (hereinafter sometimes referred to as a "fourth reception signal point") on the constellation corresponding to the second mode horizontal component reception signal C22$k$, which is obtained by the interference compensation unit 392 and has been subjected to the interference compensation processing. Then, the hard decision unit 393 outputs, for example, a difference vector between the "fourth reception signal point" and the "fourth symbol" as the "fourth error vector signal E22" indicating a difference between the "fourth reception signal point" and the "fourth symbol".

The frame synchronization units 364 and 374 detect a frame start timing by pattern matching between a known signal transmitted by vertically polarized waves from the OAM transmission apparatus 10 and received by the OAM reception apparatus 30 and a known signal held in advance. The frame synchronization units 364 and 374 output the detected frame start timing to the channel matrix estimation unit 344. Thus, the channel matrix estimation unit 344 can extract a known signal disposed at a predetermined timing in the frame.

The frame synchronization units 384 and 394 detect a frame start timing by pattern matching between a known signal transmitted by horizontally polarized waves from the OAM transmission apparatus 10 and received by the OAM reception apparatus 30 and a known signal held in advance. The frame synchronization units 384 and 394 output the detected frame start timing to the channel matrix estimation unit 354. Thus, the channel matrix estimation unit 354 can extract a known signal disposed at a predetermined timing in the frame.

Operation Example of OAM Transmission System

An operation example of the OAM transmission system with the above configuration will be described.

OAM Transmitter Operation Example

Figure 12:
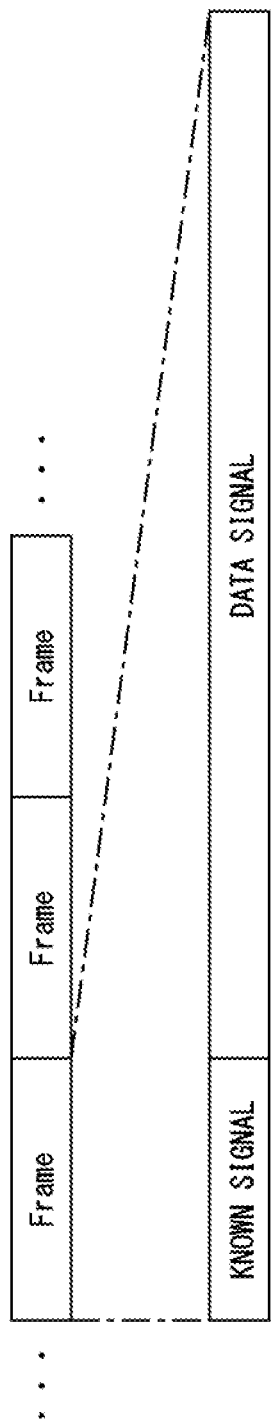
FIG. 12 is a diagram for explaining a frame.

The OAM transmission apparatus 10 transmits a signal using a plurality of consecutive frames. FIG. 12 is a diagram for explaining the frame.

As shown in FIG. 12, in each frame, a "known signal sequence (pilot signal sequence)" is mapped to a head part of the frame, and a "data signal sequence" is mapped to a part other than the head part. The patterns of the known signal sequences input to the modulators 11-1 and 11-2 and the modulators 21-1 and 21-2 are different from each other.

In the modulators 11 and 21, BPSK or QPSK is used as a modulation method for a known signal sequence. On the other hand, in the modulators 11 and 21, BPSK, QPSK, 16 QAM, 32 QAM, 64 QAM, 128 QAM, 256 QAM or the like is used as a modulation system for a data signal sequence.

Operation Example of OAM Reception Apparatus

<Frame Synchronization>

The OAM reception apparatus 30 turns on the OAM reception processing units 342, 343, 352, and 353 and the demodulation processing units 36 to 39 in order to establish frame synchronization. The frame synchronization units 364, 374, 384, and 394 detect the frame start timing and outputs the detected frame start timing to the channel matrix estimation units 344 and 354. Then, the OAM reception apparatus 30 turns off the OAM reception processing units 342, 343, 352, and 353.

<Estimation of Channel Matrix and Calculation of Initial Value of OAM Reception Weight Vector>

The OAM reception apparatus 30 turns on the channel matrix estimation units 344 and 354 and the weight calculation units 345 and 355. Then, the channel matrix estimation units 344 and 354 extract a "known signal" from the signal that has been subjected to the reception radio processing and received from the reception radio unit 33 based on the frame start timing, and calculates the channel matrix based on the extracted "known signal".

The weight calculation units 345 and 355 correct the conjugate transpose matrix of the "basic weight matrix" corresponding to the "used OAM mode" based on the channel matrix calculated by the channel matrix estimation units 344 and 354 to calculate an initial value of the "OAM reception apparatus matrix". The weight calculation units 345 and 355 set the initial value of the calculated "OAM reception weight matrix" in the OAM reception processing units 342, 343, 352, and 353. Then, the OAM reception apparatus 30 turns off the channel matrix estimation units 344 and 354 and the weight calculation units 345 and 355.

<Reception of Data Signals>

The OAM reception apparatus 30 turns on the OAM reception processing units 342, 343, 352, and 353. Then, the OAM reception processing unis 342, 343, 352, and 353 execute the "OAM reception processing" while adjusting (updating) the "OAM reception weight vector" based on the "error vector signal" received from the hard decision units 363, 373, 383, and 393.

Each of the equalizers 361, 371, 381, and 391 executes the distortion component removal processing while adjusting (updating) the plurality of filter coefficients based on the "error vector signal" received from the corresponding hard decision units 363, 373, 383, and 393.

Each of the interference compensation units 362, 372, 382, and 392 performs the interference compensation processing while adjusting (updating) a plurality of filter coefficients based on the "error vector signal" received from the corresponding hard decision units 363, 373, 383, and 393.

Each of the hard decision units 363, 373, 383, and 393 specifies a "symbol" based on the reception signal point on the constellation corresponding to the signal that has been subjected to the interference compensation processing obtained by the corresponding interference compensation units 362, 372, 382, and 392. Each of the hard decision units 363, 373, 383, and 393 outputs an error vector signal indicating a difference between the specified "symbol" and the reception signal point to the OAM reception processing units 342, 343, 352, and 353, the equalizers 361, 371, 381, and 391, and the interference compensation units 362, 372, 382, and 392. The symbol specified by each of the hard decision units 363, 373, 383, and 393 is output to a function unit (not shown) in a subsequent stage of the demodulation processing units 36 to 39.

Here, the update of the initial value of the "OAM reception weight matrix" is performed at intervals of a frame period even at the most frequent interval, because the known signal is used for calculating the channel matrix. On the other hand, the OAM reception processing units 342, 343, 352, and 353 sequentially (e.g., at intervals of a symbol period) adjust (update) the "OAM reception weight vector" based on the "error vector signal" received from the hard decision units 363, 373, 383, and 393. By doing so, the OAM reception processing can be executed using the "OAM reception weight vector" that is more suitable for the communication status between the OAM transmission apparatus 10 and the OAM reception apparatus 30. As described above, since the OAM signal weight vector that is suitable for the communication status is obtained by the sequential adjustment of the OAM reception weight vector, the initialization of the OAM signal weight vector by the weight calculation units 345 and 355 may be executed, for example, at the time of starting the communication.

In the above description, although the OAM transmission apparatus 10 transmits a known signal using a plurality of used OAM modes and dual polarized waves in order to cause the OAM reception apparatus 30 to calculate the channel matrix, the present disclosure is not limited to this. The OAM transmission apparatus 10 may transmit a known signal using one used OAM mode (e.g., mode 0) and dual polarized waves to cause the OAM reception apparatus 30 to calculate the channel matrix.

Here, the calculation of the channel matrix by the channel matrix estimation units 344 and 354 and the calculation of the initial value of the OAM reception weight matrix by the weight calculation units 345 and 355 will be described in detail.

First, the relationship between the transmission signal and the reception signal can be expressed by the following formula (1).

[Formula 1]

$$y(t)=W_R H W_T x(t) \quad (1)$$

In this formula (1), y(t) is a reception signal (a signal after OAM separation, namely, a signal that has been subjected to the OAM reception processing) at a time t. Further, x(t) is a transmission signal (signal before OAM multiplexing) at the time t. H is a channel matrix. $W_T$ is an OAM transmission weight matrix. $W_R$ is an OAM reception weight matrix.

Next, an ideal state in which the transmission antenna element and the reception antenna element face each other is considered. At this time, the channel matrix H becomes a cyclic matrix ($H_{id}$). Here, it is assumed that the OAM transmission apparatus 10 includes a UCA antenna composed of N transmission antenna elements, and the OAM reception apparatus 30 includes a UCA antenna composed of N reception antenna elements.

Due to the properties of the cyclic matrix, "$W_R H W_T$" in the formula (1) can be diagonalized (A) using a DFT (Discrete Fourier Transform) matrix D. Thus, the formula (1) can be modified into the following formula (2).

[Formula 2]

$$y(t)=Ax(t) \quad (2)$$

Here, A is expressed by the formula (3). Further, since A is a diagonal matrix, it can be expressed as the formula (4).

[Formula 3]

$$A = D^H H_{id} D \quad (3)$$

[Formula 4]

$$A = \begin{bmatrix} a_0 & & & \\ & a_1 & & 0 \\ & & \ddots & \\ 0 & & & a_{N-1} \end{bmatrix} \quad (4)$$

Here, when the UCA antenna of the OAM transmission apparatus 10 and the UCA antenna of the OAM reception apparatus 30 are actually installed, for example, a minute angle smaller than 1° is generated, so that the channel matrix H does not become a channel matrix $H_{id}$ in an ideal state.

The channel matrix $H_{nid}$ in the non-ideal state can be modeled by the following formula (5).

[Formula 5]

$$H=H_{nid}=RH_{id} \quad (5)$$

R is a matrix representing the difference between the channel matrix $H_{nid}$ in the non-ideal state and the channel matrix $H_{id}$ in the ideal state.

The relationship between the transmission signal and the reception signal at this time can be expressed by the following formula (6).

[Formula 6]

$$y(t)=W_R H W_T x(t)=W_R R H_{id} W_T x(t) \quad (6)$$

By using the conjugate transpose of the DFT matrix D corrected by an inverse matrix of R as the OAM reception weight matrix $W_R$ in the formula (6), the diagonalization as shown in the formula (2) becomes possible. Here, when the "conjugate transpose of the DFT matrix D corrected by an inverse matrix of R" is expressed by, for example, the following formula (7), the diagonalization (A) can be expressed by the following formula (8).

[Formula 7]

$$W_R = D^H R^{-1} \quad (7)$$

[Formula 8]

$$A = D^H R^{-1} R H_{id} D = D^H H_{id} D \quad (8)$$

Therefore, in order to obtain the OAM reception weight matrix expressed by the formula (7), the inverse matrix of R may be calculated. As described above, R represents the difference between the channel matrix $H_{id}$ in the ideal state and the channel matrix $H_{nid}$ in the non-ideal state.

First, calculating the channel matrix $H_{id}$ in the ideal state is equivalent to calculating the phase rotation based on the path $(d_{k,l})$ between the N transmission antenna elements and the N reception antenna elements in the ideal state. The amount of phase rotation based on each path can be geometrically calculated by design values, the "number of antenna elements (N)", an "array radius (r)", a "wavelength $(\lambda)$", and a "transmission distance (Z)" between transmission and reception measured at the time of installation. Here, the path $(d_{k,l})$ means a path between the k-th transmission antenna element and the l-th reception antenna element.

The path $(d_{k,l})$ can be expressed by the following formula (9). The channel matrix $H_{id}$ in the ideal state can be expressed by the following formula (10).

[Formula 9]

$$d_{k,l} = \\ \left\{ \left( r\cos\left(\frac{2\pi k}{N}\right) - r\cos\left(\frac{2\pi l}{N}\right) \right)^2 + \left( r\sin\left(\frac{2\pi k}{N}\right) - r\sin\left(\frac{2\pi l}{N}\right) \right)^2 + Z^2 \right\}^{1/2} \quad (9)$$

[Formula 10]

$$H_{id} = \begin{bmatrix} e^{i\frac{2\pi}{\lambda}d_{0,0}} & e^{i\frac{2\pi}{\lambda}d_{0,1}} & \cdots & e^{i\frac{2\pi}{\lambda}d_{0,N-1}} \\ e^{i\frac{2\pi}{\lambda}d_{1,0}} & \ddots & & \\ \vdots & & & \\ e^{i\frac{2\pi}{\lambda}d_{N-1,0}} & & & e^{i\frac{2\pi}{\lambda}d_{N-1,N-1}} \end{bmatrix} \quad (10)$$

The channel matrix $H_{nid}$ in the non-ideal state can be estimated using a known signal (pilot signal (p)). The reception signal (y) and the pilot signal (p) have a relationship represented by the following formula (11).

[Formula 11]

$$y = H_{nid} D p = H_{nid} s \quad (11)$$

D is a DFT matrix having a matrix size of N×N.

Then, the estimated channel matrix $\hat{H}_{id}$ can be calculated by matrix-multiplying the reception signal by a previously calculated matrix $(s^H V^{-1})$, as shown in the following formula (12).

[Formula 12]

$$y\{s^H V^{-1}\} = \hat{H}_{nid}\{ss^H(ss^H)^{-1}\} = \hat{H}_{nid} \quad (12)$$

As described above, the channel matrix estimation units 344 and 354 can calculate the channel matrix $\hat{H}_{nid}$ using, for example, the formula (12). The weight calculation units 345 and 355 calculate R using the channel matrix $\hat{H}_{nid}$ and the channel matrix $H_{id}$ in the ideal state. Then, the weight calculation units 345 and 355 can calculate the initial value of the "OAM reception weight matrix" by correcting the conjugate transpose of the DFT matrix (i.e., the base weight matrix) D by the inverse matrix of R, as shown in the formula (7).

As described above, according to the second example embodiment, the OAM reception unit 34 in the OAM reception apparatus 30 executes the OAM reception processing while adjusting (updating) the first OAM reception weight matrix based on the first error vector signal obtained by the hard decision unit 363 and the second error vector signal obtained by the hard decision unit 373.

Such a configuration of the OAM reception apparatus 30 enables adaptive OAM reception processing.

Further, in the OAM reception apparatus 30, the channel matrix estimation unit 344 calculates a first channel matrix based on the four vertical component signals that have been subjected to the reception radio processing corresponding to known signals received from the reception radio units 33A-1, 33B-1, 33C-1, and 33D-1 and transmitted by vertically polarized waves from the OAM transmission apparatus 10. The weight calculation unit 345 corrects the conjugate transpose matrix of the basic weight matrix based on the first channel matrix calculated by the channel matrix estimation unit 344, and calculates the initial value of the first OAM reception weight matrix.

With this configuration of the OAM reception apparatus 30, it is possible to calculate the initial value of the first OAM reception weight matrix suitable matrix for an acceptable accuracy range with respect to the communication status between the OAM transmission apparatus 10 and the OAM reception apparatus 30.

In the OAM reception apparatus 30, the OAM reception unit 34 adjusts the first OAM reception weight matrix based on the first error vector signal corresponding to the data signal transmitted by the vertically polarized waves and the first OAM mode and the second error vector signal corresponding to the data signal transmitted by the vertically polarized waves and the second OAM mode. Here, the OAM transmission apparatus 10 transmits a known signal at the head part of each frame, and transmits a data signal at a data transmission part excluding the head part of each frame.

Since the first OAM reception weight matrix can be adjusted at intervals of a symbol period with the configuration of the OAM reception apparatus 30, the first OAM reception weight matrix can be made close to a value that is more suitable for the communication status between the OAM transmission apparatus 10 and the OAM reception apparatus 30 at a higher speed.

Although the present disclosure has been described with reference to the example embodiments, the present disclosure is not limited by the above. The configuration and details of the present disclosure may be modified in various ways as will be understood by those skilled in the art within the scope of the disclosure.

The present disclosure provides an OAM reception apparatus, an OAM reception method, and an OAM transmission system that can receive a signal wirelessly transmitted by a combination of OAM transmission and dual polarized wave transmission with inter-polarization interference compensation.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a radio communication line.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The invention claimed is:

1. An orbital angular momentum (OAM) reception apparatus comprising:
hardware, including a processor and memory;
a plurality of reception antenna elements configured to receive a plurality of radio signals respectively transmitted from a plurality of transmission antenna elements of an OAM transmission apparatus, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves;
a first OAM reception unit implemented at least by the hardware and that forms a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by performing polarization separating and reception radio processing on a plurality of reception radio signals received by the plurality of reception antenna elements, by a first OAM reception weight matrix;
a second OAM reception unit implemented at least by the hardware and that forms a first mode horizontal component reception signal corresponding to the first OAM mode and a second mode horizontal component reception signal corresponding to the second OAM mode by multiplying the plurality of horizontal component signals by a second OAM reception weight matrix;
a first interference compensation unit implemented at least by the hardware and that removes an interference component caused by the horizontally polarized waves relative to the vertically polarized waves using both the first mode horizontal component reception signal and the second mode horizontal component reception signal from the first mode vertical component reception signal;
a second interference compensation unit implemented at least by the hardware and that removes an interference component caused by the horizontally polarized waves relative to the vertically polarized waves using both the first mode horizontal component reception signal and the second mode horizontal component reception signal from the second mode vertical component reception signal;
a third interference compensation unit implemented at least by the hardware and that removes an interference component caused by the vertically polarized waves relative to the horizontally polarized waves using both the first mode vertical component reception signal and the second mode vertical component reception signal from the first mode horizontal component reception signal; and a fourth interference compensation unit implemented at least by the hardware and that removes an interference component caused by the vertically polarized waves relative to the horizontally polarized waves using both the first mode vertical component reception signal and the second mode vertical component reception signal from the second mode horizontal component reception signal.

2. The OAM reception apparatus according to claim 1, further comprising:
a first hard decision unit implemented at least by the hardware and that specifies a first symbol based on a first reception signal point on a constellation corresponding to a signal from which the interference component is removed by the first interference compensation unit, and output a first error vector signal indicating a difference between the specified first symbol and the first reception signal point; and
a second hard decision unit implemented at least by the hardware and that specifies a second symbol based on a second reception signal point on a constellation corresponding to a signal from which the interference component is removed by the second interference compensation unit, and output a second error vector signal indicating a difference between the specified second symbol and the second reception signal point, wherein
the first OAM reception unit is configured to adjust the first OAM reception weight matrix based on the first error vector signal and the second error vector signal.

3. The OAM reception apparatus according to claim 2, further comprising:
a channel matrix estimation unit implemented at least by the hardware and that calculates a channel matrix related to a channel between the plurality of transmission antenna elements and the plurality of reception antenna elements based on a known signal transmitted by the vertically polarized waves from the OAM transmission apparatus; and
a weight calculation unit implemented at least by the hardware and that corrects a conjugate transpose matrix of a basic weight matrix corresponding to the first OAM mode and the second OAM mode based on the calculated channel matrix to calculate an initial value of the first OAM reception weight matrix.

4. The OAM reception apparatus according to claim 3, wherein
the OAM transmission apparatus is configured to transmit the known signal at a head part of each frame, and transmit a data signal at a data transmission part other than the head part of each frame,
the first OAM reception unit is configured to adjust the first OAM reception weight matrix based on the first error vector signal corresponding to the data signal transmitted by the vertically polarized waves and the first OAM mode and the second error vector signal corresponding to the data signal transmitted by the vertically polarized waves and the second OAM mode.

5. The OAM reception apparatus according to claim 4, wherein
the first interference compensation unit comprises:
a first interference component replica forming unit implemented at least by the hardware and that forms a first horizontal interference component replica by the horizontally polarized waves relative to the vertically polarized waves by filtering the first mode horizontal component reception signal using a plurality of first filter coefficients; and
a second interference component replica forming unit implemented at least by the hardware and that forms a second horizontal interference component replica by the horizontally polarized waves relative to the vertically polarized waves by filtering the second mode horizontal component reception signal using a plurality of second filter coefficients, wherein
the first interference component replica forming unit is configured to adjust the plurality of first filter coefficients based on the first error vector signal, and
the second interference component replica forming unit is configured to adjust the plurality of second filter coefficients based on the first error vector signal.

6. The OAM reception apparatus according to claim 5, further comprising:
a first equalization unit provided between the first OAM reception unit and the first interference compensation unit and implemented at least by the hardware and that filters the first mode vertical component reception signal using a plurality of third filter coefficients to remove a distortion component; and
a second equalization unit provided between the second OAM reception unit and the second interference compensation unit and implemented at least by the hardware and that filters the second mode vertical component reception signal using a plurality of fourth filter coefficients to remove a distortion component, wherein
the first equalization unit is configured to adjust the plurality of third filter coefficients based on the first error vector signal, and
the second equalization unit configured to adjust the plurality of fourth filter coefficients based on the second error vector signal.

7. An orbital angular momentum (OAM) reception method executed by an OAM reception apparatus comprising:
a plurality of reception antenna elements configured to receive a plurality of radio signals respectively transmitted from a plurality of transmission antenna elements of an OAM transmission apparatus, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves, the OAM reception method comprising:
forming a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by performing polarization separating and reception radio processing on a plurality of reception radio signals received by the plurality of reception antenna elements, by a first OAM reception weight matrix;
forming a first mode horizontal component reception signal corresponding to the first OAM mode and a second mode horizontal component reception signal corresponding to the second OAM mode by multiplying the plurality of horizontal component signals by a second OAM reception weight matrix;
removing an interference component caused by the horizontally polarized waves relative to the vertically polarized waves using both the first mode horizontal component reception signal and the second mode horizontal component reception signal from the first mode vertical component reception signal;
removing an interference component caused by the horizontally polarized waves relative to the vertically polarized waves using both the first mode horizontal component reception signal and the second mode horizontal component reception signal from the second mode vertical component reception signal;

removing an interference component caused by the vertically polarized waves relative to the horizontally polarized waves using both the first mode vertical component reception signal and the second mode vertical component reception signal from the first mode horizontal component reception signal; and removing an interference component caused by the vertically polarized waves relative to the horizontally polarized waves using both the first mode vertical component reception signal and the second mode vertical component reception signal from the second mode horizontal component reception signal.

8. An orbital angular momentum (OAM) transmission system comprising:

an OAM transmission apparatus; and an OAM reception apparatus, wherein the OAM transmission apparatus is configured to transmit, from a plurality of transmission antenna elements, a plurality of radio signals, each radio signal including a first OAM mode multiplexed radio signal and a second OAM mode multiplexed radio signal formed using a first OAM mode and a second OAM mode, the first OAM mode multiplexed radio signal being transmitted by vertically polarized waves, the second OAM mode multiplexed radio signal being transmitted by horizontally polarized waves, the OAM reception apparatus comprises:

hardware, including a processor and memory;

a plurality of reception antenna elements configured to receive the plurality of transmitted radio signals;

a first OAM reception unit implemented at least by the hardware and that forms a first mode vertical component reception signal corresponding to the first OAM mode and a second mode vertical component reception signal corresponding to the second OAM mode by multiplying a plurality of vertical component signals, from among the plurality of vertical component signals and a plurality of horizontal component signals which have been obtained by performing polarization separating and reception radio processing on a plurality of reception radio signals received by the plurality of reception antenna elements, by a first OAM reception weight matrix;

a second OAM reception unit implemented at least by the hardware and that forms a first mode horizontal component reception signal corresponding to the first OAM mode and a second mode horizontal component reception signal corresponding to the second OAM mode by multiplying the plurality of horizontal component signals by a second OAM reception weight matrix;

a first interference compensation unit implemented at least by the hardware and that removes an interference component caused by the horizontally polarized waves relative to the vertically polarized waves using both the first mode horizontal component reception signal and the second mode horizontal component reception signal from the first mode vertical component reception signal;

a second interference compensation unit implemented at least by the hardware and that removes an interference component caused by the horizontally polarized waves relative to the vertically polarized waves using both the first mode horizontal component reception signal and the second mode horizontal component reception signal from the second mode vertical component reception signal;

a third interference compensation unit implemented at least by the hardware and that removes an interference component caused by the vertically polarized waves relative to the horizontally polarized waves using both the first mode vertical component reception signal and the second mode vertical component reception signal from the first mode horizontal component reception signal; and a fourth interference compensation unit implemented at least by the hardware and that removes an interference component caused by the vertically polarized waves relative to the horizontally polarized waves using both the first mode vertical component reception signal and the second mode vertical component reception signal from the second mode horizontal component reception signal.

* * * * *